US008717333B2

(12) United States Patent
Ozeki et al.

(10) Patent No.: US 8,717,333 B2
(45) Date of Patent: May 6, 2014

(54) ELECTROSTATIC CAPACITY TYPE TOUCH PANEL, DISPLAY DEVICE AND PROCESS FOR PRODUCING ELECTROSTATIC CAPACITY TYPE TOUCH PANEL

(75) Inventors: Masao Ozeki, Arakawa-ku (JP); Atsushi Iwasaki, Arakawa-ku (JP)

(73) Assignee: OPTREX Corporation, Tokyo (JP)

( * ) Notice: Subject to any disclaimer, the term of this patent is extended or adjusted under 35 U.S.C. 154(b) by 269 days.

(21) Appl. No.: 13/044,665

(22) Filed: Mar. 10, 2011

(65) Prior Publication Data
US 2011/0157086 A1 Jun. 30, 2011

Related U.S. Application Data

(63) Continuation of application No. PCT/JP2009/065864, filed on Sep. 10, 2009.

(30) Foreign Application Priority Data

Sep. 12, 2008 (JP) .................................. 2008-234934

(51) Int. Cl.
G06F 3/044 (2006.01)
(52) U.S. Cl.
CPC ...... G06F 3/044 (2013.01); *G06F 2203/04111* (2013.01)
USPC .......................................................... 345/174
(58) Field of Classification Search
CPC ............................................ G06F 2203/04111
USPC .......................................................... 345/174
See application file for complete search history.

(56) References Cited

U.S. PATENT DOCUMENTS

| 2003/0049456 A1* | 3/2003 | Kawasato et al. ............. 428/421 |
| 2008/0007534 A1 | 1/2008 | Peng et al. |
| 2008/0264699 A1 | 10/2008 | Chang et al. |
| 2008/0309635 A1 | 12/2008 | Matsuo |
| 2009/0046077 A1* | 2/2009 | Tanaka et al. ................. 345/174 |
| 2010/0295819 A1 | 11/2010 | Ozeki et al. |

FOREIGN PATENT DOCUMENTS

| CN | 101131492 A | 2/2008 |
| JP | 58-166437 | 10/1983 |
| JP | 3134925 | 8/2007 |
| JP | 2007-272644 | 10/2007 |
| JP | 2008-310550 | 12/2008 |

OTHER PUBLICATIONS

International Search Report issued Oct. 27, 2009 in Japanese Patent Application No. PCT/JP2009/065864 filed Sep. 21, 2010.
U.S. Appl. No. 13/242,515, filed Sep. 23, 2011, Ozeki, et al.
Combined Chinese Office Action and Search Report issued Jan. 22, 2013, in Patent Application No. 200980131149.0 (with English-language translation).

* cited by examiner

*Primary Examiner* — Amr Awad
*Assistant Examiner* — Randal Willis
(74) *Attorney, Agent, or Firm* — Oblon, Spivak, McClelland, Maier & Neustadt, L.L.P.

(57) ABSTRACT

An electrostatic capacity type touch panel having on one surface of a transparent substrate, a plurality of columns of column electrodes extending in a first direction and a plurality of columns of column electrodes extending in a second direction intersecting the first direction,
such column electrodes extending in the first direction and such column electrodes extending in the second direction being eclectically disconnected from each other by an electrically insulating layer provided at least in a part of each intersection region of the column electrodes, and at least one of the two intersecting column electrodes being electrically connected by a bridge wire provided in the intersection region.

25 Claims, 16 Drawing Sheets (a)

(b)

(a)

(b)

(a)

(b)

(a)

(b)

(a)

(b)

(a)

(b)

ELECTROSTATIC CAPACITY TYPE TOUCH PANEL, DISPLAY DEVICE AND PROCESS FOR PRODUCING ELECTROSTATIC CAPACITY TYPE TOUCH PANEL

TECHNICAL FIELD

The present invention relates to an electrostatic capacity type touch panel, a display device provided with the function of such a touch panel, and a process for producing such an electrostatic capacity type touch panel.

BACKGROUND ART

An electrostatic capacity type touch panel is a device for detecting a touch position by capturing a change of electrostatic capacity caused by approach of an electrically conductive body such as a finger of human. For example, such an electrostatic capacity type touch panel is used as a touch switch realizing a switching operation when a finger contacts with a predetermined portion of the panel.

Further, a display device with an electrostatic type touch panel function has been developed, which is a device wherein an electrostatic type touch panel is disposed on e.g. a front surface of a liquid crystal display device to integrate display and input functions.

For example, when portions to be detected are determined in advance, as shown in FIGS. 17(a) and 17(b), it is sufficient that transparent electrode patterns made of e.g. ITO (indium tin oxide) are disposed at such portions and wirings are made to the electrodes. FIGS. 17(a) and 17(b) are explanation views showing an arrangement example of transparent electrode patterns in an electrostatic capacity type touch panel. Here, FIG. 17(a) shows an arrangement example of transparent electrode patterns observed from a front side (a side to be touched) of a touch panel. Further, FIG. 17(b) is a cross-sectional view (A-A' cross-sectional view) of the touch panel shown in FIG. 17(a). In the example shown in FIGS. 17(a) and 17(b), on a rear surface of a transparent substrate 91 (a surface opposite from a side to be touched), transparent electrodes and their lead wires are formed so as to corresponding to respective portions to be detected.

However, in order to detect an optional touch portion in terms of its x-y coordinate, it is necessary to arrange transparent electrode patterns in a matrix form in x-direction and y-direction, and to detect a touch position from their intersection points. Here, "arrange in a matrix form" means to arrange transparent electrode patterns forming columns in two directions independently so that columns of electrode patterns in one direction intersect columns of electrode patterns in the other direction.

As a method for forming an arrangement in such a matrix form, there is a method of preparing at least two transparent substrates each having a surface on which transparent electrode patterns arranged in one of the directions constituting the matrix form are formed, and laminating these transparent substrates on which such transparent electrode patterns are formed, via e.g. a resin to constitute a matrix form (hereinafter referred to as a first method).

FIGS. 18(a) and 18(b) are explanation views showing an arrangement example of a case of arranging transparent electrode patterns in a matrix form by using the first method. Here, FIG. 18(a) shows an arrangement example of transparent electrode patterns observed from the front side of a touch panel, and FIG. 18(b) is a cross-sectional view (A-A' cross-sectional view) of the touch panel shown in FIG. 18(a). In the example shown in FIGS. 18(a) and 18(b), four columns of transparent electrode patterns 921 are formed on one surface of the transparent substrate 911 so as to correspond to respective X coordinates, and six columns of transparent electrode patterns 922 are formed on one surface of another transparent substrate 912 so as to correspond to respective Y coordinates, and these two transparent substrates 911 and 912 are bonded by using an adhesive agent 93 such as a resin to constitute transparent electrode patterns arranged in a matrix form.

Further, as another method, there is a method of forming transparent electrode patterns arranged in respective directions on surfaces of front side and rear side of a single transparent substrate, to arrange the transparent electrode patterns in a matrix form (hereinafter referred to as a second method).

FIGS. 19(a) and 19(b) are explanation views showing an arrangement example of arranging transparent electrode patterns in a matrix form by using the second method. Here, FIG. 19(a) shows an arrangement example of transparent electrode patterns observed from the front side of a touch panel, and FIG. 19(b) is a cross-sectional view (A-A' cross-sectional view) of the touch panel shown in FIG. 19(a). In the example shown in FIGS. 19(a) and 19(b), four columns of transparent electrode patterns 921 are formed on a surface of the front side of a transparent substrate 91 so as to correspond to respective X coordinates, and six columns of transparent electrode patterns 922 are formed on a surface of the rear side of the transparent substrate 91 so as to correspond to respective Y coordinates, to arrange the transparent electrode patterns in a matrix form.

Further, an example of electrostatic capacity type touch panel wherein transparent electrode patterns are arranged in a matrix form, is described in, for example, Patent Document 1.

PRIOR ART DOCUMENT

Patent Document

Patent Document 1: JP-A-2007-272644

DISCLOSURE OF THE INVENTION

Problems to be Solved by the Invention

However, in the first method, it is necessary to prepare at least two transparent substrates and to form transparent electrode patterns on each of the transparent substrates, and there is a problem that the production cost is increased for patterning the electrodes.

Further, in the second method, it is necessary to form transparent electrode patterns on both sides of a transparent substrate, and there is also problem that the production cost increases. Further, there is also a problem that the electrode patterns tend to be scratched.

Here, Patent Document 1 describes a method of arranging transparent electrode patterns on one surface of a single transparent substrate and folding back the transparent substrate on which the transparent electrode patterns are formed, to constitute a matrix. However, in this method, although the patterning cost can be decreased, since it is necessary to fold back the transparent substrate, there is a problem that the material is restricted and such a fabrication step increases the production cost.

Under the circumstances, it is an object of the present invention to provide an electrostatic capacity type touch panel having a good quality with low production cost, a display device with such an electrostatic capacity type touch panel function, and a process for producing such an electrostatic capacity type touch panel. More specifically, it is an object of the present invention to provide an electrostatic capacity type touch panel wherein patterning of transparent electrode patterns is easy, the relative position accuracy of transparent electrode patterns constituting a matrix form is good, and which has a high durability against e.g. scratching by contact; a display device with such an electrostatic capacity type touch panel function, and a process for producing such an electrostatic capacity type touch panel.

Means for Solving the Problems

The electrostatic capacity type touch panel of the present invention is characterized by comprising a transparent substrate, a plurality of columns of column electrodes present on one surface of the transparent substrate and extending in a first direction and a plurality of columns of column electrodes present on said one surface of the substrate and extending in a second direction intersecting the first direction; such a column electrode extending in the first direction being electrically disconnected from such a column electrode extending in the second direction by an electrically insulating layer provided at least in a part of an intersection region of the column electrodes, and at least one of the two intersecting column electrodes being electrically connected by a bridge wire (for example, bridge wire 401) provided in the intersection region.

Further, the construction may be such that the column electrodes extending in the first direction and the column electrodes extending in the second direction are arranged on the same surface of the transparent substrate so as not to overlap with one another except for an intersection portion of one of intersecting column electrodes present at each intersection region.

Further, the construction may be such that at least one of the first column electrode and the second column electrode is constituted by a column electrode pattern (for example, column electrode pattern 2-$B_1$ shown in FIG. 3) including a plurality of electrode units (for example, electrode units 201c and 201d shown in FIG. 2) and connecting wires (for example, connecting wires 202 shown in FIG. 2) connecting the electrode units.

Further, the construction may be such that at least one of the first column electrode and the second column electrode is constituted by a column electrode pattern (for example, column electrode pattern 2-$A_1$ shown in FIG. 3) including a plurality of electrode units arranged so as to be disconnected from one another and so as not to overlap with the other column electrode, and bridge wires (for example, bridge wire 401) each connecting adjacent electrode units (for example, electrode units 201a and 201b shown in FIG. 2) included in the column electrode pattern so as to sandwich an electrically insulating layer between the bridge wire and the other column electrode present between the electrode units.

Further, the electrostatic capacity type touch panel of the present invention may be one comprising a transparent substrate, a plurality of columns of column electrode patterns (for example, column electrode patterns 2-$A_1$ to 2-$A_6$ shown in FIG. 3) arranged on one surface of the transparent substrate and each including a plurality of disconnected electrode units (for example, electrode units 201a and 201b shown in FIG. 2) arranged along a first direction, and a plurality of columns of column electrode patterns (for example, column electrode patterns 2-$B_1$ to 2-$B_4$ shown in FIG. 3) arranged on said one surface of the substrate and each including a plurality of disconnected electrode units (for example, electrode units 201c and 201d shown in FIG. 2) arranged along a second direction intersecting the first direction; each electrode pattern of the second direction including connecting wires (for example, connecting wire 202) each connecting adjacent electrode units of the plurality of electrode units included in the electrode pattern; each connecting wire being provided at least in a part of a region where the electrode pattern including the connecting wire intersects another electrode pattern so that the connecting wire is provided through a space between electrode units of said another electrode pattern so as to be isolated from the electrode units; the electrostatic capacity type touch panel further comprising an electrically insulating layer (for example, insulating layer 3) covering each region where a wiring region required to connect electrode units of each column electrode pattern of the first direction, that are not connected by a connecting wire, overlaps with a connecting wire of the column electrode pattern of the second direction provided through a space between the electrode units; and the electrostatic capacity type touch panel further comprising a bridge wire (for example, bridge wire 401) connecting the electrode units included in the column electrode pattern of the first direction in a state that the electrically insulating layer is sandwiched between the bridge wire and the connecting wire of the column electrode pattern of the second direction.

In such a case, adjacent electrode units included in the column electrode pattern of the first direction have electric conduction with each other by the bridge wire to constitute the column electrode extending in the first direction, and adjacent electrode units included in the column electrode pattern of the second direction have electric conduction with each other by the connecting wire to constitute the column electrode extending in the second direction.

Further, the electrostatic capacity type touch panel of the present invention may be one comprising a transparent substrate, a plurality of columns of column electrode patterns (for example, column electrode patterns 2-$A_1$ to 2-$A_6$ shown in FIG. 10) arranged on one surface of the transparent substrate and each including a plurality of disconnected electrode units arranged along a first direction, and a plurality of columns of column electrode patterns (for example, column electrode patterns 2-$B_1$ to 2-$B_4$ shown in FIG. 10) arranged on the surface of the transparent substrate and each including a plurality of disconnected electrode units arranged along a second direction intersecting the first direction; at least one of such a column electrode pattern of the first direction and such a column electrode pattern of the second direction, that intersect each other, further including at least one connecting wire for connecting at least one pair of adjacent electrode units in the plurality of electrode units included in the electrode pattern; each connecting wire being provided at least in a pair of a region where the electrode pattern intersects another electrode pattern so that the connecting wire is provided through a space between electrode units of said another electrode pattern so as to be isolated from the electrode units; the electrostatic capacity type touch panel further comprising an electrically insulating layer covering a region where a wiring region required to connect electrode units of the column electrode pattern of the first direction or the column electrode pattern of the second direction, that are not connected by the connecting wire, overlaps with the other electrode pattern present between the electrode units; the electrostatic capacity type touch panel further comprising a bridge wire connecting electrode units that are not connected with the connecting wire, so that the electrically insulating layer is sandwiched between the bridge wire and said the other electrode pattern present between the electrode units. Thus, it is also possible to determine which column electrode pattern is provided with the connecting wire and which column electrode pattern is provided with the bridge wire, in each intersection region, without restricting the direction of the column electrode pattern having the connecting wire or the bridge wire to be one of the directions.

In such a case, adjacent electrode units included in the column electrode pattern of the first direction have electric conduction by a bridge wire or a connecting wire to constitute the column electrode extending in the first direction, and adjacent electrode units included in the column electrode pattern of the second direction have electric conduction by the bridge wire or the connecting wire to constitute a column electrode extending in the second direction.

Further, the construction may be such that the column electrode patterns of the first direction and the column electrode patterns of the second direction are arranged so as not to overlap on the same plane of the transparent substrate.

Further, the touch panel of the present invention may further comprise a transparent electrode covering the entire surface of a substrate present on the other side of the column electrodes formed on the transparent substrate, from a surface to be touched.

Further, for example, the shape of the electrode unit may be polygonal. Further, for example, the column electrode pattern may be constituted by a transparent electrically conductive film.

Further, the display device with an electrostatic capacity type touch panel function of the present invention is characterized in that the electrostatic capacity type touch panel having the construction shown above is laminated on a viewer side surface via a resin layer (for example, adhesion layer 5).

Further, the process for producing an electrostatic capacity type touch panel of the present invention is a process comprising a transparent electrode pattern-forming step of forming on the same surface of a transparent substrate a transparent electrode pattern including a column electrode pattern extending in a first direction and including a plurality of disconnected electrode units arranged along the first direction, and a column electrode pattern extending in a second direction and including a plurality of disconnected electrode units arranged along the second direction, and a connecting wire connecting electrode units constituting at least one of the column electrode patterns and provided at least in a part of an intersection region where the column electrode pattern extending in the first direction intersects the column electrode pattern extending in the second direction; an electrically insulating layer-forming step of forming an electrically insulating layer covering a region where a wiring region necessary to connect electrode units constituting the column electrode pattern having no connecting wire, the electrode units being disposed so as to be isolated from the connecting wire in the intersection region so as to avoid electrical conduction with the connecting wire, overlaps with the connecting wire provided through a space between the electrode units, to form an electrically insulating layer; and an electrically insulating layer-forming step between the transparent electrode pattern forming step and the bridge-wiring pattern forming step, the electrically insulating layer-forming step being a step of forming an electrically insulating layer covering at least a region where the connecting wire included in the transparent electrode pattern overlaps with the bridge wire included in the bridge-wiring pattern.

Further, the process for producing an electrostatic capacity type touch panel of the present invention may comprise, in the following order, a transparent electrode pattern-forming step of forming on the same surface of a transparent substrate a transparent electrode pattern including a column electrode pattern extending in a first direction and including a plurality of disconnected electrode units arranged along the first direction, a column electrode pattern extending in a second direction and including a plurality of disconnected electrode units arranged along the second direction, and a connecting wire connecting electrode units constituting at least one of the column electrode patterns and provided at least in a part of an intersection region where the column electrode pattern extending in the first direction intersects the column electrode pattern extending in the second direction; an electrically insulating layer-forming step of forming an electrically insulating layer covering a region where a wiring region necessary to connect electrode units constituting the column electrode pattern having no connecting wire, the electrode units being disposed so as to be isolated from the connecting wire in the intersection region so as to avoid electrical conduction with the connecting wire, overlaps with the connecting wire provided through a space between the electrode units, to form an electrically insulating layer; and a bridge-wiring pattern-forming step of forming a bridge-wiring pattern including a bridge wire connecting electrode units disposed so as to be isolated from the connecting wire in the intersection region so as not to have electric conduction with the connecting wire, and so as to sandwich the electrically insulating layer between the bridge wire and the connecting wire present through a space between the electrode units.

Further, the process for producing an electrostatic capacity type touch panel of the present invention may comprise, in the following order, a bridge-wiring pattern-forming step of forming on the same surface of one side of the transparent substrate a bridge-wiring pattern including a bridge wire to be disposed at a predetermined portion of the surface of the transparent substrate for connecting electrode units constituting a column electrode pattern having no connecting wire, the electrode units being disposed so as to be isolated from a connecting wire to so as to have no electric conduction with the connecting wire in the intersection region included in the transparent electrode pattern, the transparent electrode pattern including a column electrode pattern extending in a first direction and including a plurality of disconnected electrode units arranged along the first direction, a column electrode pattern extending in a second direction and including a plurality of disconnected electrode units arranged along the second direction, and a connecting wire provided at least in a part of an intersection region where the column electrode pattern extending in the first direction intersects the column electrode pattern extending in the second direction, so that the connecting wire connects electrode units constituting one of the column electrode patterns; an electrically insulating layer-forming step of forming an electrically insulating layer covering an intermediate portion of the bridge wire included in the bridge-wiring pattern so that both ends of the bridge wire are exposed; and a transparent electrode pattern-forming step of forming the transparent electrode pattern at a position whereby the electrode units constituting the column electrode pattern having no connecting wire in the transparent electrode pattern, are connected by the bridge wire for connecting the electrode units, so that the electrode units have electrical conduction from each other.

Effects of the Invention

The present invention provides an electrostatic capacity type touch panel having a construction that on one surface of a transparent substrate, column electrodes of the first direction and the second direction arranged in a matrix form are electrically disconnected from each other by an electrically insulating layer provided in their intersecting region, and a bridge wire is provided in at least one of the column electrodes in the intersection region, whereby patterning of the electrode pattern is easy, the relative position accuracy among column electrode patterns constituting the matrix form is good, and the panel has a high durability against scratching by contact; and the present invention further provides a display device with an electrostatic capacity type touch panel function. Accordingly, it is possible to provide an electrostatic capacity type touch panel having a good quality with a low production cost, a display device with an electrostatic capacity type touch panel function, and a process for producing such an electrostatic capacity type touch panel.

MODE FOR CARRYING OUT THE INVENTION

Figure 1:
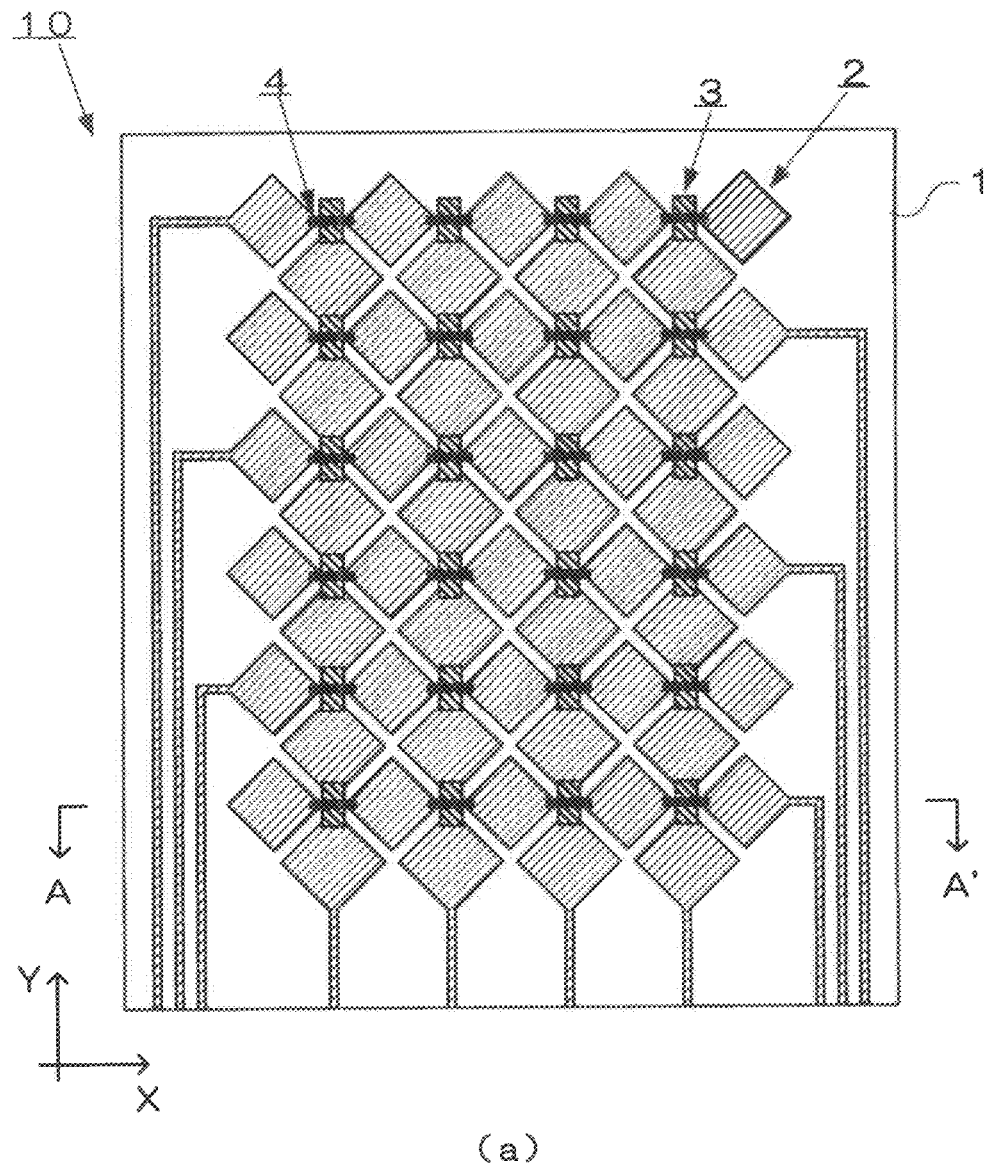
FIG. 1(a) is a plan view showing an example of the construction of an electrostatic capacity type touch panel of the present invention.
FIG. 1(b) is a cross-sectional view along the line A-A' in FIG. 1(a).
Figure 1:
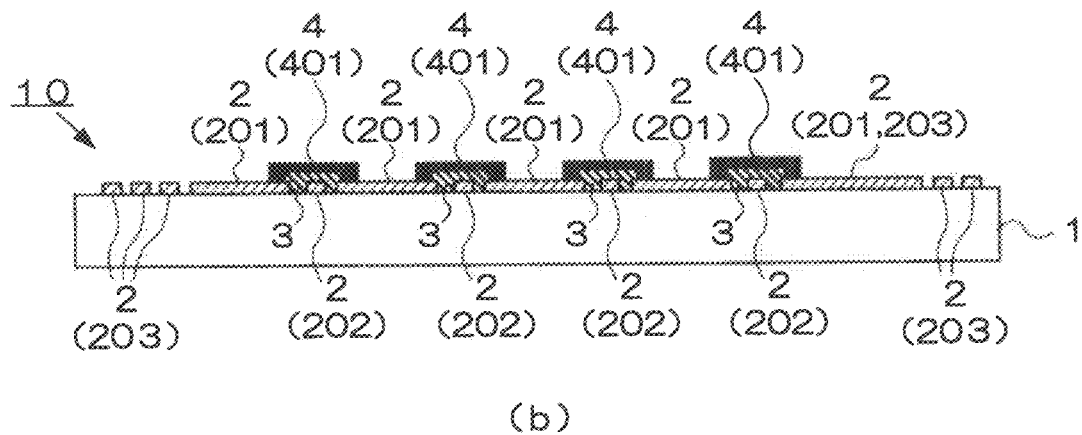

Now, embodiments of the present invention will be described with reference to drawings. FIGS. 1(a) and 1(b) are explanation views showing an example of the construction of an electrostatic capacity type touch panel of the present invention. Here, FIG. 1(a) is a plan view of a touch panel 10 being an example of the electrostatic capacity type touch panel of the present invention. Further, FIG. 1(b) is a cross-sectional view (A-A' cross-sectional view) of the touch panel 10. Here, FIG. 1(a) shows a plan view of the touch panel 10 when it is observed from the rear side, and FIG. 1(b) shows a cross-sectional view of the touch panel 10 wherein the rear side of the touch panel 10 is at the top side.

The touch panel 10 shown in FIGS. 1(a) and 1(b) is constituted by column electrodes formed on one surface of a transparent substrate 1 and extending in intersecting two respective axis directions, and an electrically insulating layer provided between the respective column electrodes in their intersection portion to make the column electrodes electrically disconnected. In order to detect a touch position, column electrodes extending in respective axis directions have to be independent from each other. For this reason, in the present invention, on one surface of the transparent substrate 1, a transparent electrode pattern 2 is formed, which is constituted by column electrode patterns constituting a matrix form (a plurality of electrode patterns extending in each axis direction) arranged in a single layer of transparent electrode pattern so that in each intersection region of two columns, one of the columns is divided so as not to contact with the other column; and a bridge-wiring pattern 4 is formed, which is a patterned bridge wires 401 for connecting the disconnected portions of the transparent electrode pattern 2; and moreover, an insulating layer 3 made of an insulative material is formed between the transparent electrode pattern 2 and the bridge-wiring pattern 4 in the region (intersection region) where the bridge-wiring pattern 4 overlaps with the transparent electrode pattern 2.

By the above process, column electrodes of a first axis direction and column electrodes of a second axis direction arranged in a matrix form are formed on one surface of the transparent substrate 1.

Here, in the example shown in FIGS. 1(a) and 1(b), on one surface of the transparent substrate 1, the transparent electrode pattern 2 is formed first, and the insulating layer 3 is formed to cover predetermined portions of the transparent electrode pattern 2 (non-disconnected portions of the column electrode patterns in intersection regions), and thereafter, a bridge wire 401 bridging the insulating layer 3 formed in each intersection region to have conduction over the divided portion (that is, a bridge-wiring pattern 4) are formed.

Figure 2:
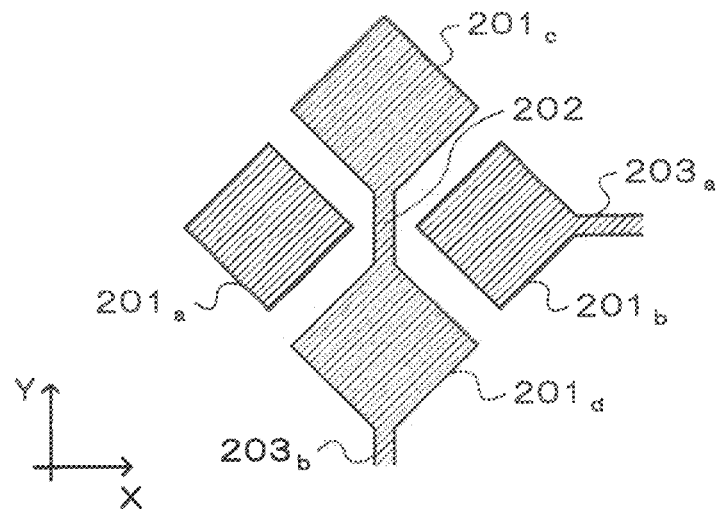
FIG. 2 is an explanation view showing an arrangement example of transparent electrode pattern.
Figure 3:
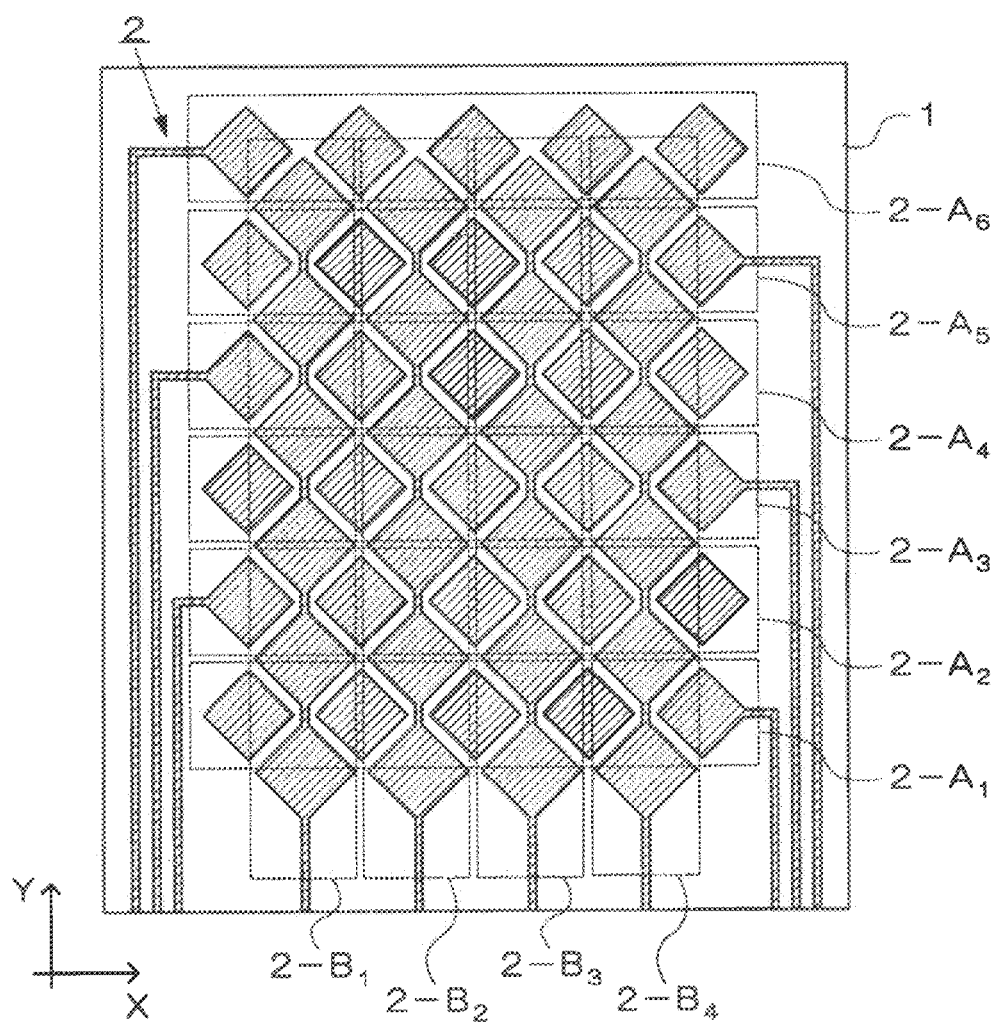
FIG. 3 is an explanation view showing an arrangement example of transparent electrode pattern.

FIGS. 2 and 3 show an arrangement example of the transparent electrode pattern 2. The transparent electrode pattern 2 shown in FIGS. 1(a) and 1(b) is, as magnified in FIG. 2, constituted by an electrode unit group including at least two electrode units 201 constituting a column along X axis direction (for example, electrode units $201_a$, $201_b$) and at least two electrode units 201 constituting a column along Y axis direction (for example, electrode units $201_c$, $201_d$) provided that intersecting two axes are defined as X axis direction and Y axis direction; and a connecting wire 202 for connecting electrode units arranged in one of the axis directions among electrode units arranged along the intersecting X axis direction and Y axis direction (in the example shown in FIG. 2, electrode units $201_a$, $201_b$ and electrode units $201_c$, $201_d$). For example, the electrode units $201_a$, $201_b$ shown in FIG. 2 each corresponds to a constituent constituting the column electrode pattern 2-$A_1$ in FIG. 3. Further, for example, electrode units $201_c$, $201_d$ shown in FIG. 2 each corresponds to a constituent constituting the column electrode pattern 2-$B_1$ in FIG. 3. Here, in the example shown in FIG. 2, lead wires 203 (for example, lead wires $203_a$, $203_b$) to the electrode group forming columns, are also shown. It is sufficient that each lead wire 203 is connected to any one of electrode units 201 constituting a column electrode pattern.

Here, as a constituent of column electrode pattern, it is also possible to define a combined electrode of the electrode units 201 and the connecting wire 202 as one unit of transparent electrode without distinguishing them. For example, in the example shown in FIG. 2, it is also possible to define a combination of the electrode unit $201_c$, the electrode unit $201_d$, the connecting wire 202 and the lead wire $203_b$, as a single transparent electrode. In this case, in the example shown in FIG. 2, it is also possible to define that the transparent electrode pattern 2 includes at least three independent transparent electrodes including a single transparent electrode (a transparent electrode constituted by the electrode unit $201_c$, the electrode unit $201_d$, the connecting wire 202 and the lead wire $203_b$ in this case) and two transparent electrodes disposed on both sides of the transparent electrode (a transparent electrode constituted by the electrode unit $201_a$ and a transparent electrode constituted by the electrode unit $201_b$ and the lead wire $203_a$). Further, for example, it is also possible to define a column electrode extending in the first direction or the second direction as a single band-shaped electrode without distinguishing the electrode units 201 and the connecting wires 202.

In the present invention, as shown in FIG. 3, the column electrode constituted by electrode units 201 arranged along each axis direction to form a column, is defined as a single column electrode pattern regardless of whether or not the electrode units 201 are connected by the connecting wires 202. This is because even if the electrode units are not connected by the connecting wires 202 at this time, they are finally connected by bridge wires 401. For example, FIG. 3 shows an example wherein 10 column electrode patterns 2-$A_1$ to 2-$A_6$ and 2-$B_1$ to 2-$B_4$ are formed. Namely, in the present invention, electrode units included in each column electrode pattern have electric conduction by a connecting wires 202 or bridge wires 401, to constitute each column electrode constituting the matrix form.

FIG. 3 shows an example of forming six columns of column electrode patterns 2-$A_1$ to 2-$A_6$ for detecting Y axis coordinate are formed as column electrode patterns extending along X axis direction. Further, the figure shows an example wherein four columns of column electrode patterns 2-$B_1$ to 2-$B_4$ for detecting X axis coordinate are formed as column electrode patterns formed along Y axis direction.

It is sufficient that the electrode units 201 are arranged separately from one another with a small gap on a plane according to the shape of the electrode units, and that an optional accuracy of a touch panel is obtained. For example, each of electrode units 201 forming a column in X axis direction and electrode units 201 forming a column in Y axis direction may have a polygonal shape such as a rectangular shape, a rhombic shape or a hexagonal shape, and they may be arranged in a staggered form or a linear form so that the electrode units 201 are densely arranged in the entire touching region and that the intersection region of electrode patterns 2 of respective axis directions becomes as small as possible. Further, each electrode unit may have a notch or a hole provided in its shape. In such a construction, the electrode unit becomes hardly visible for users.

The transparent substrate 1 is an electrically insulating substrate, which may, for example, be a glass substrate, a PET (polyethylene terephthalate) film/sheet or a PC (polycarbonate) film/sheet.

Further, as the transparent electrically insulating material constituting the insulating layer 3, an inorganic material such as $SiO_2$ or an organic resin material such as a resin for photolithography may, for example be employed. In the case of $SiO_2$, it is easily possible to obtain a patterned insulating layer by a sputtering method, and in the case of a resin for photolithography, it is easily possible to obtain a patterned insulating layer by a photolithography process. Here, in a case of forming the insulating layer made of an inorganic material by a sputtering method using a mask, considering the alignment accuracy of mask position, it is necessary to make the bridge wire longer to safely and securely obtain electric connection by the bridge wire. On the other hand, in the case of photolithography process, the above-mentioned patterning of the insulating layer becomes easy.

Particularly, when the transparent substrate is a glass substrate, the electrically insulating material is preferably a photolithography resin, that is a photosensitive resin, having a group reactive with a silanol group generated on a surface of the glass substrate. By using such a photosensitive resin, a chemical bond is formed between the glass substrate and the photosensitive resin, to form an insulating layer having a high adhesive force. For example, as such a photosensitive resin, a photosensitive acryl type resin, a photosensitive methacryl type resin, a photosensitive polyimide type resin, a photosensitive polysiloxane type resin, a photosensitive polyvinyl type resin or a photosensitive acrylic urethane type resin may, for example, be mentioned.

Further, when the bridge wire is made of a metal material and its metal color is visible when it is observed from the rear surface side of the transparent substrate, that is a surface opposite from a surface to be touched with e.g. a finger of human, the insulating layer is preferably made of e.g. a concealing material.

As the electrically conductive material constituting the bridge wiring pattern 4 (that is, each bridge wire 401), a transparent electrically conductive film made of ITO may, for example, be employed. Further, by narrowing the wiring width of each bridge wire 401, it is possible to use a metal material such as Mo (molybdenum), Al (aluminum) or Au (gold). In the case of employing a metal material, the bridge wiring pattern may have a multilayer structure. For example, it may have a Mo—Al—Mo three layer structure. Further, in order to suppress corrosion, the material may be an alloy. For example, Mo containing a slight amount of Nb (niobium) or Al containing a slight amount f Nd (neodymium) are known. A bridge wire made of such a metal material is not necessarily transparent, and it may be reflective.

Particularly, when the transparent substrate is a glass substrate, a metal material such as Mo, a Mo alloy, Al, an Al alloy, Au or an Au alloy, that has high adhesiveness to the glass substrate, that has higher electrical conductivity than ITO and that is excellent in durability and abrasion resistance, is preferably employed. As an alloy having still higher corrosion resistance, a Mo—Nb type alloy or an Al—Nd type alloy may, for example, be mentioned as a preferred example. A bridge wire made of such a metal material has a higher electric conductivity than a bridge wire made of ITO. Accordingly, it is possible to make the bridge wire narrower in the wiring width, shorter and thinner to increase the degree of freedom of the design of bridge wiring, thereby to improve the external appearance of the bridge wire, such being preferred in terms of the design of the product.

Next, the process for producing the touch panel 10 of this embodiment will be described. First, an ITO film is formed on one surface of a transparent substrate 1 by using e.g. a sputtering method, the formed ITO film is patterned into a shape shown in FIG. 3 by using e.g. a photolithography method, to form a transparent electrode pattern 2. Next, by using a mask pattern 7 shown in FIG. 4, a film of an insulating material is formed on the surface of the transparent substrate 1 on which the transparent electrode pattern 2 is formed (a surface on which the transparent electrode pattern 2 is formed) by using e.g. a sputtering method, thereby to form an insulating layer 3 covering specific portions of the transparent electrode pattern 2 shown in FIG. 5 (regions where column electrode patterns extending in parallel along X axis direction intersect column electrode patterns extending in parallel along Y axis direction). FIG. 5 is an explanation view showing an example of touch panel 10 in a state that the insulating layer 3 is formed.

Figure 6:
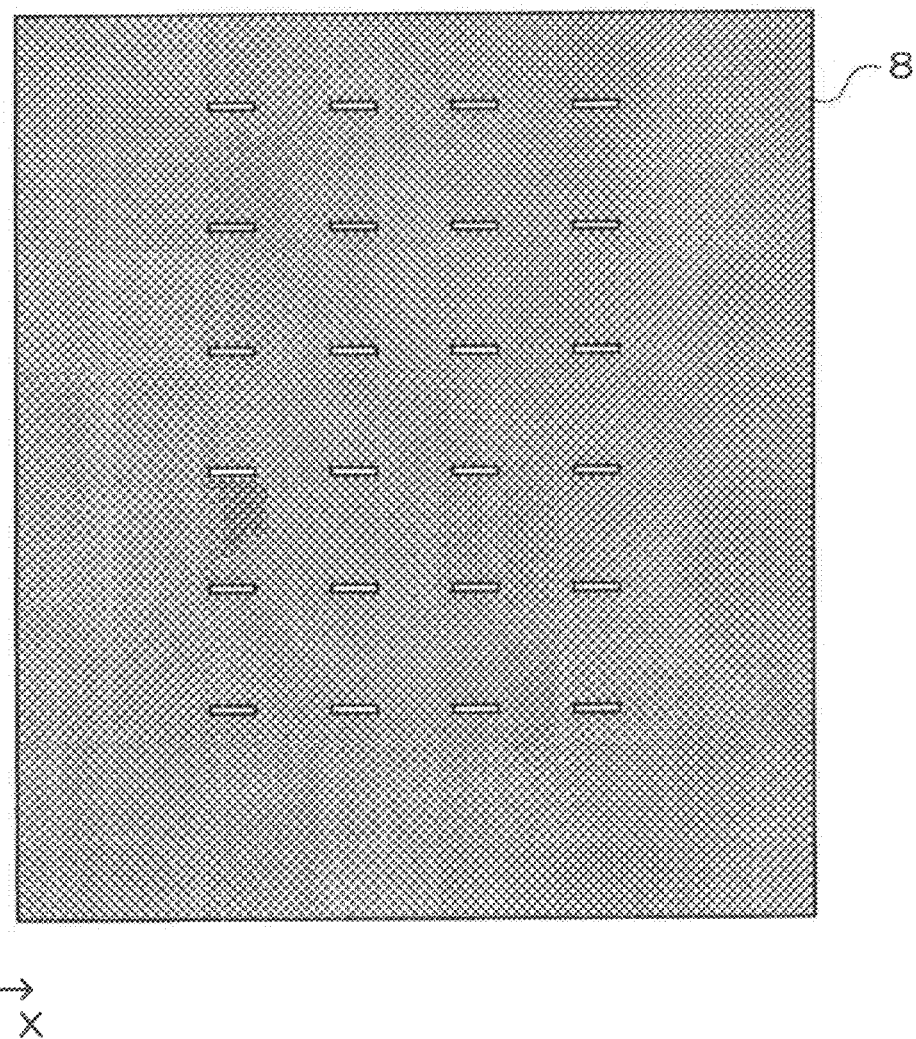
FIG. 6 is an explanation view showing an example of mask pattern for forming a bridge-wiring pattern.

Next, by using a mask pattern 8 shown in FIG. 6, a film of an electrically conductive material is formed on the surface of the transparent substrate 1 on which the insulating layer 3 is formed (a surface on which the insulating layer 3 is formed) by using e.g. a sputtering method, to form a bridge wiring pattern 4 wherein each bridge wire 401 connecting predetermined portions of the transparent electrode pattern 2 (disconnected electrode units in the column electrode pattern 2) so as to bridge over the insulating layer 3. By this step, a state shown in FIGS. 1(a) and 1(b) is completed.

Figure 7:
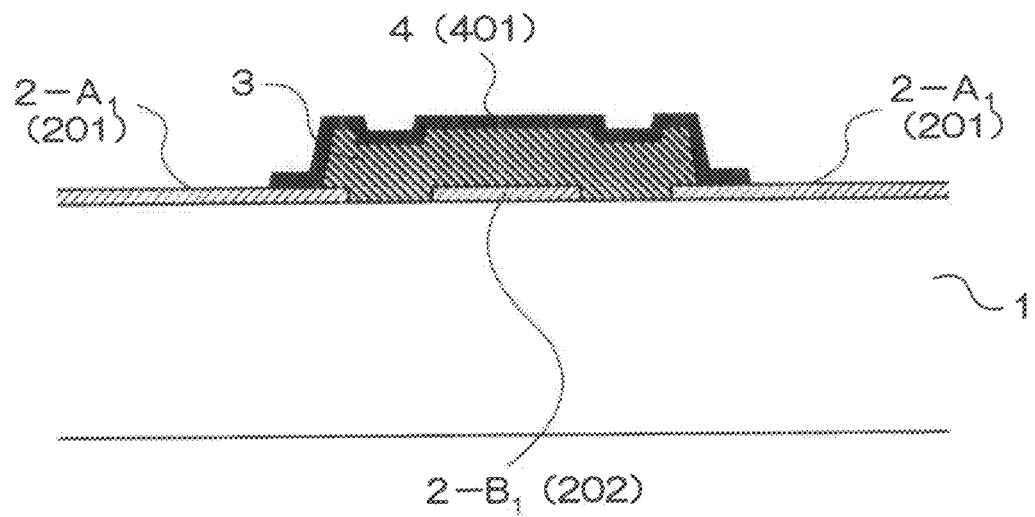
FIG. 7 is an explanation view showing a state that a transparent electrode pattern, an insulating layer and a bridge-wiring pattern are laminated on a transparent substrate.

FIG. 7 is an enlarged explanation view showing a state that the transparent electrode pattern 2, the insulating 3 and the bridge wiring pattern 4 are laminated on the transparent substrate 1. Here, FIG. 7 is a cross-sectional view showing a section along X axis direction, of a region where a column electrode pattern 2-$A_1$ intersects a column electrode pattern 2-$B_1$. As shown in FIG. 7, in the region where the column electrode pattern 2-$A_1$ intersects the column electrode pattern 2-$B_1$, it is sufficient that the transparent electrode pattern 2 is formed so that the column electrode patterns 2-$A_1$ are disconnected (disconnected shape), while the column electrode pattern 2-$B_1$ is not disconnected (connected shape). Further, it is sufficient that an insulating layer 3 is formed so as to cover a connecting wire 202 portion of the column electrode pattern 2-$B_1$ formed into a connected shape, and that a pattern 4 including a bridge wire 401 connecting the disconnected column electrode pattern 2-$A_1$ (more specifically, two electrode units 201 arranged linearly to constitute the column electrode pattern 2-$A_1$) so as to bridge over the insulating layer 3.

Here, in the example shown in FIGS. 1(a) and 1(b), the transparent electrode pattern 2 is formed first, the insulating layer 3 is formed in the next step, and subsequently, the bridge wiring pattern 4 is formed. However, this order may be opposite. Namely, the process may be such that the bridge wiring pattern 4 wherein each bridge wire 401 is arranged in a portion to be an intersection region first, the insulating layer 3 is formed so as to cover each intermediate portion of each bridge wire 401 so as to expose both ends of the bridge wire 401 in the next step, and subsequently, the transparent electrode pattern 2 is formed so that both ends of each bridge wire 401 are connected with adjacent to electrode units, that are not connected with a connecting wire included in each column electrode pattern, so that the electrode units have an electric conduction. Here, in the present invention, a wire connecting disconnected transparent electrodes constituting one of column electrode patterns in their intersection region so that the insulating layer 3 is sandwiched between the wire and a transparent electrode (for example, connecting wire 202 or band-shaped electrode) constituting the other column electrode pattern, such a wire is referred to as a bridge wire 401 regardless of whether it is formed so as to bridge over the insulating layer 3 or it is formed so as to continue under the insulating layer 3.

Figure 8:
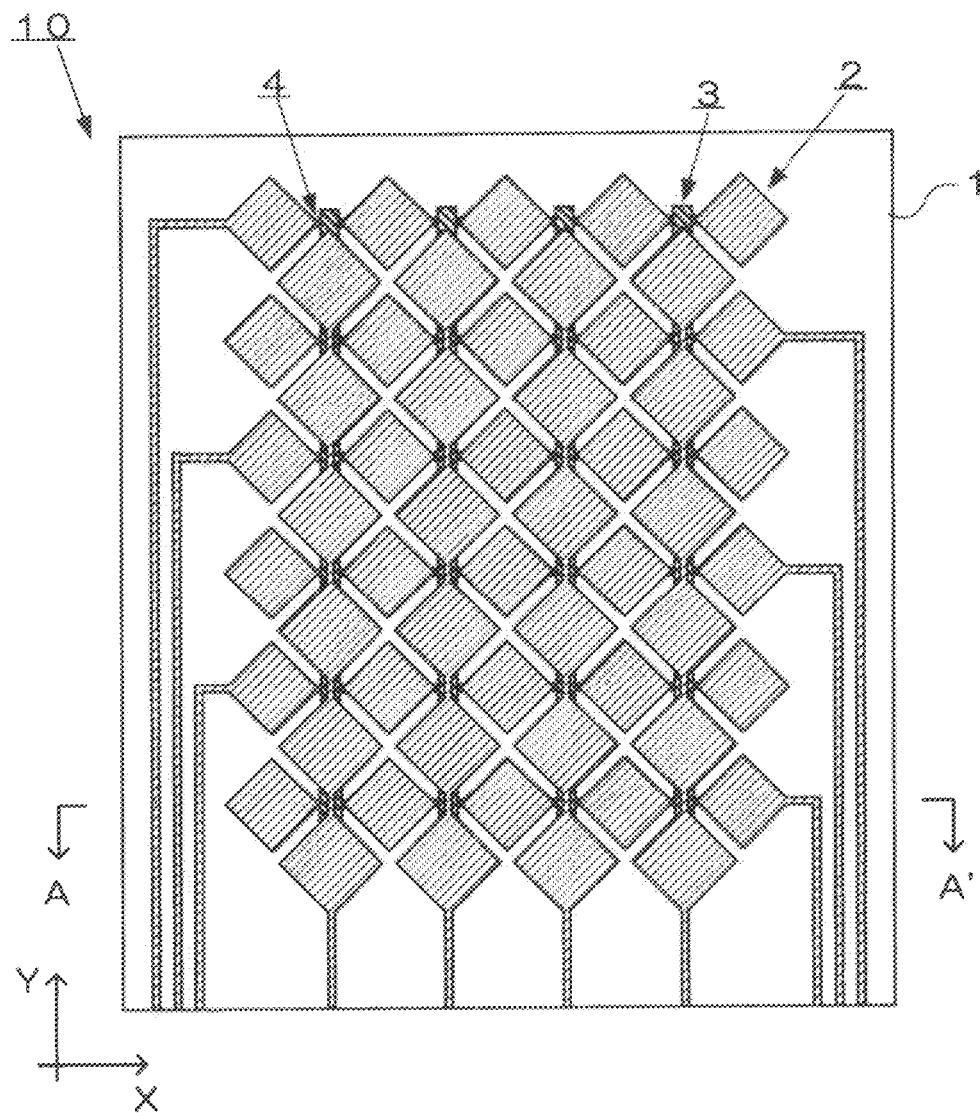
FIG. 8(a) is a plan view showing a construction example of an electrostatic capacity type touch panel when the bride wire pattern is formed first.
FIG. 8(b) is a cross-sectional view along the line A-A' in FIG. 8(a).
Figure 8:
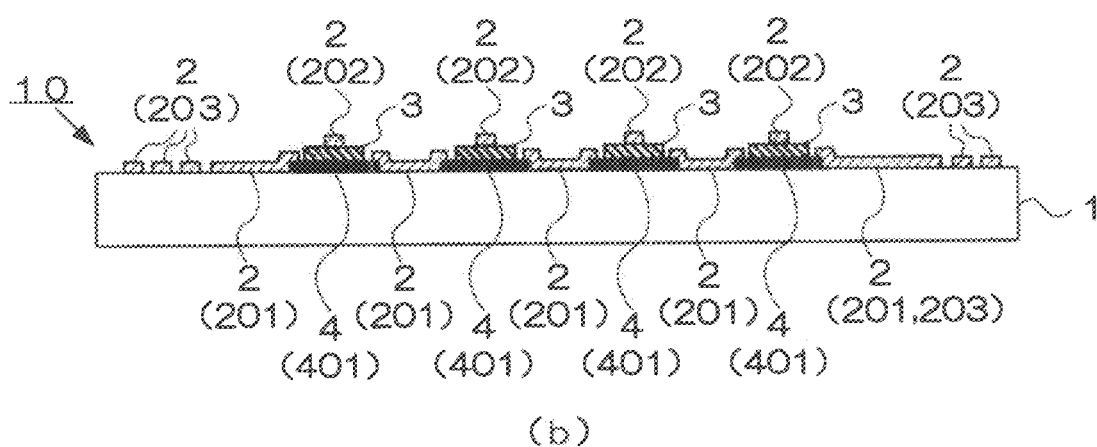

FIGS. 8(a) and 8(b) are explanation views showing a construction example of an electrostatic capacity type touch panel in a case where the bridge wiring pattern 4 is formed first. In this example shown in FIGS. 8(a) and 8(b), on one surface of a transparent substrate 1, a bridge wiring pattern 4 constituted by bridge wires 401 arranged in portions to be intersection regions first, and subsequently, an insulating layer 3 is formed so that an intermediate portion of each bridge wire 401 is covered and its both ends are exposed, and thereafter, a transparent electrode 2 is formed so that both ends of the bridge wire 401 are connected to adjacent two electrode units, that are not connected by a connecting wire included in each column electrode pattern, thereby to make the electrode units have an electric conduction.

Figure 9:
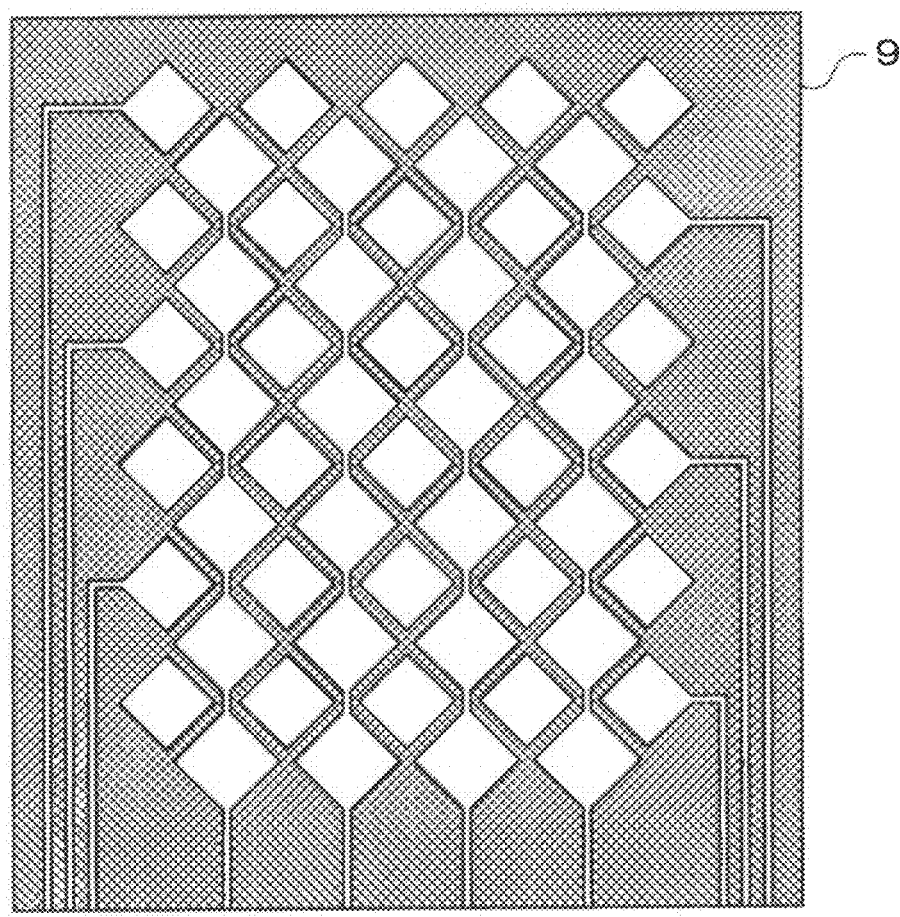
FIG. 9 is an explanation view showing an example of mask pattern for forming a transparent electrode pattern.

Here, the method for forming the transparent electrode pattern 2 may be such that an ITO film is formed by using a sputtering method and it is patterned into a predetermined shape by using e.g. a photolithography technique. As an alternative, the method may be such that an ITO film is formed on a surface of the transparent substrate 1 on which the insulating layer 3 is formed (surface on which the insulating layer 3 is formed) by e.g. a sputtering method with a mask pattern 9 shown in FIG. 9.

Further, FIG. 1(a) to FIG. 9 show examples wherein each column electrode pattern 2 of one of intersecting axis directions has a disconnected shape and each column electrode pattern 2 of the other axis direction has a connected shape. However, for example, the construction may be such that among column electrode patterns having the same axis direction, a column electrode pattern has a connected shape and another column electrode pattern has a disconnected shape. Further, for example, the construction may be such that in a single column electrode pattern, a connected shape is formed between a pair of electrode units and a disconnected shape is formed between another pair of electrode units.

Figure 10:
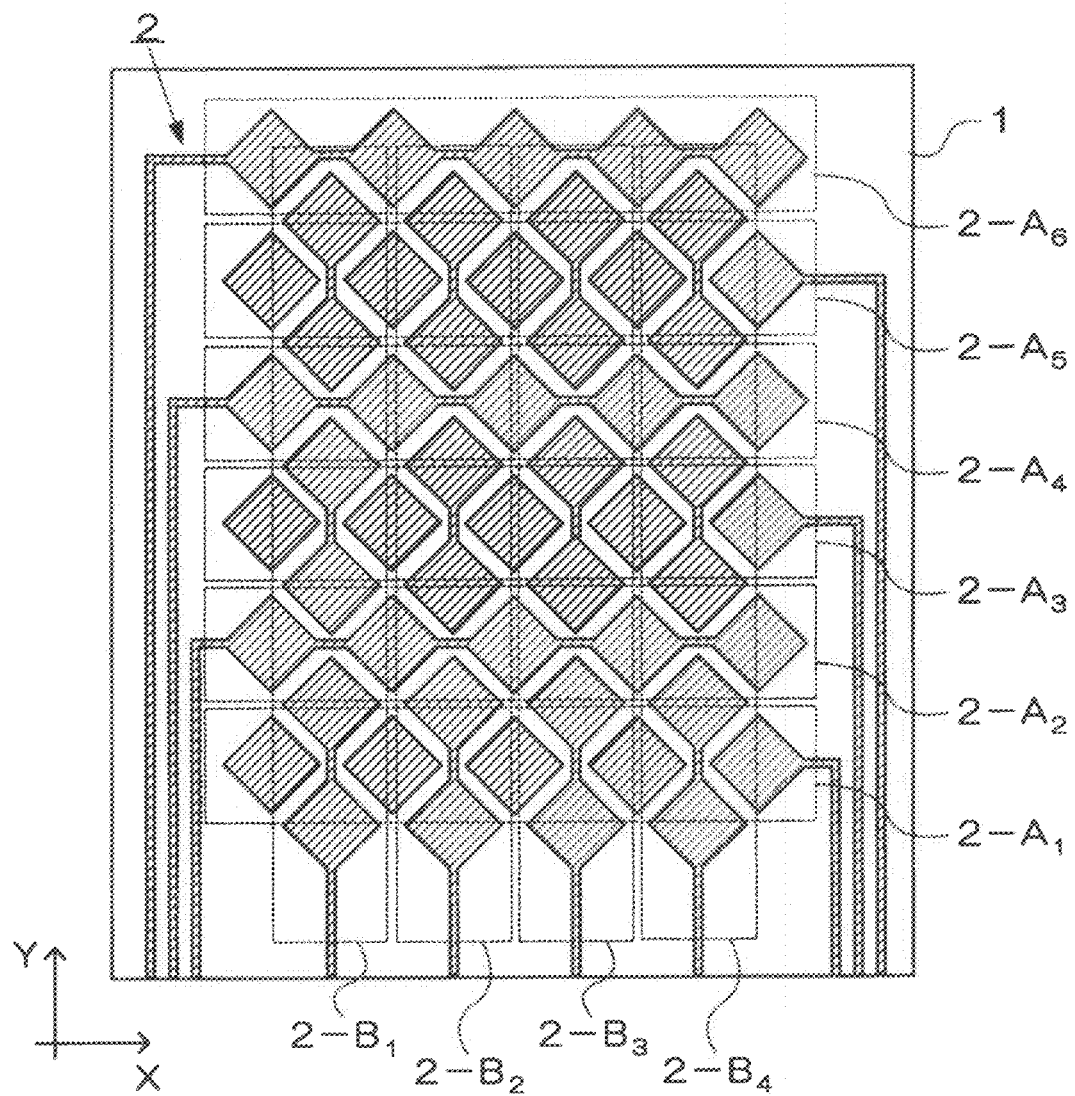
FIG. 10 is an explanation view showing another arrangement example of transparent electrode pattern.
Figure 11:
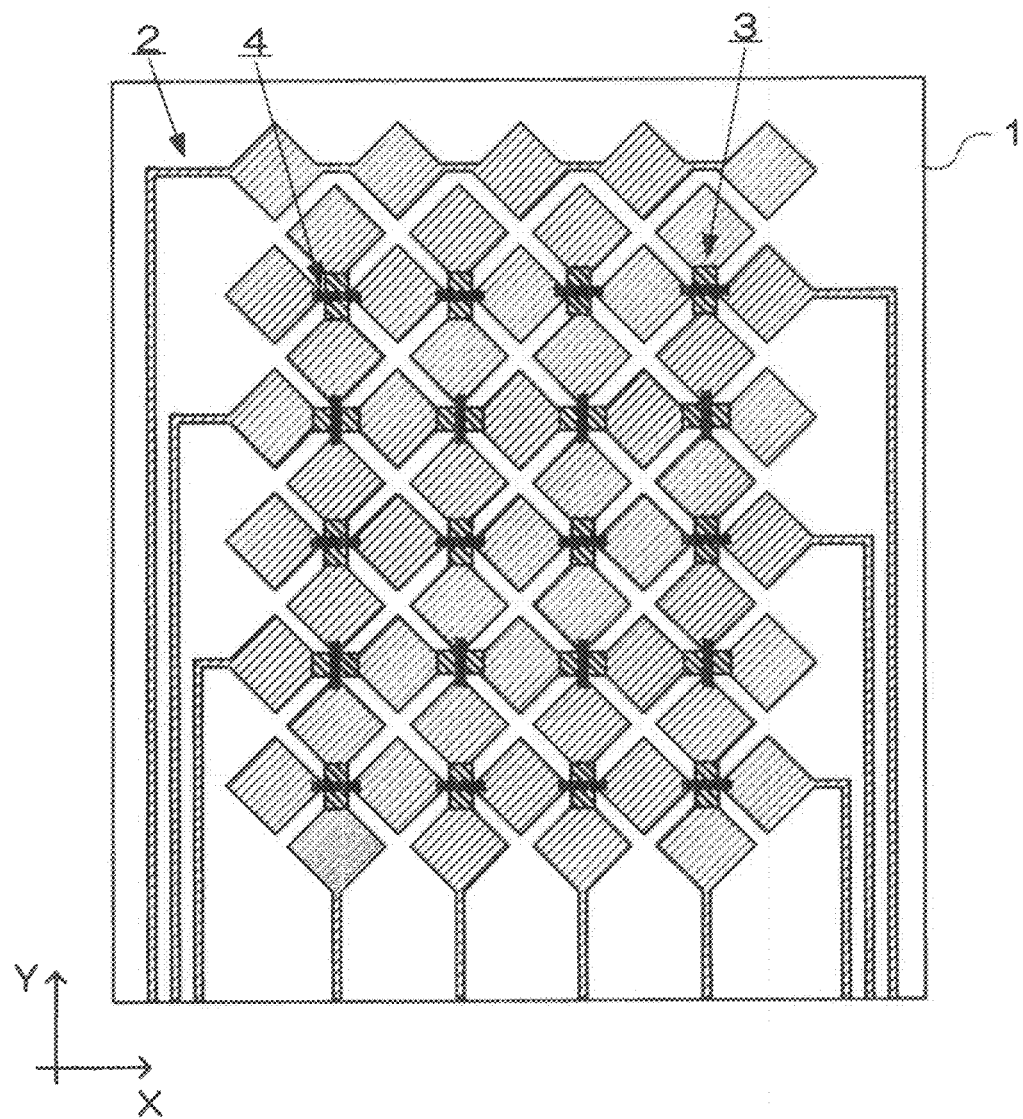
FIG. 11 is an explanation view showing a formation example of a column electrode when the transparent electrode pattern shown in FIG. 10 is employed.

FIG. 10 shows an example wherein among column electrode patterns 2-$A_1$ to 2-$A_6$ extending in parallel along X axis direction, column electrode patterns 2-$A_2$, 2-$A_4$ and 2-$A_6$ each has a connected shape, and other column electrode patterns 2-$A_1$, 2-$A_3$ and 2-$A_5$ each has a disconnected shape. Further, column electrode patterns 2-$B_1$ to 2-$B_4$ extending in parallel along Y axis direction each has a shape containing a portion having a disconnected shape and a portion having a connected shape. The column electrode patterns 2-$B_1$ to 2-$B_4$ extending in parallel along Y axis direction each has a shape wherein a pair of adjacent electrode units 201 are connected as a unit. In the case of forming the transparent electrode pattern 2 of the arrangement example shown in FIG. 10, column electrodes shown in FIG. 11 are finally formed.

Figure 12:
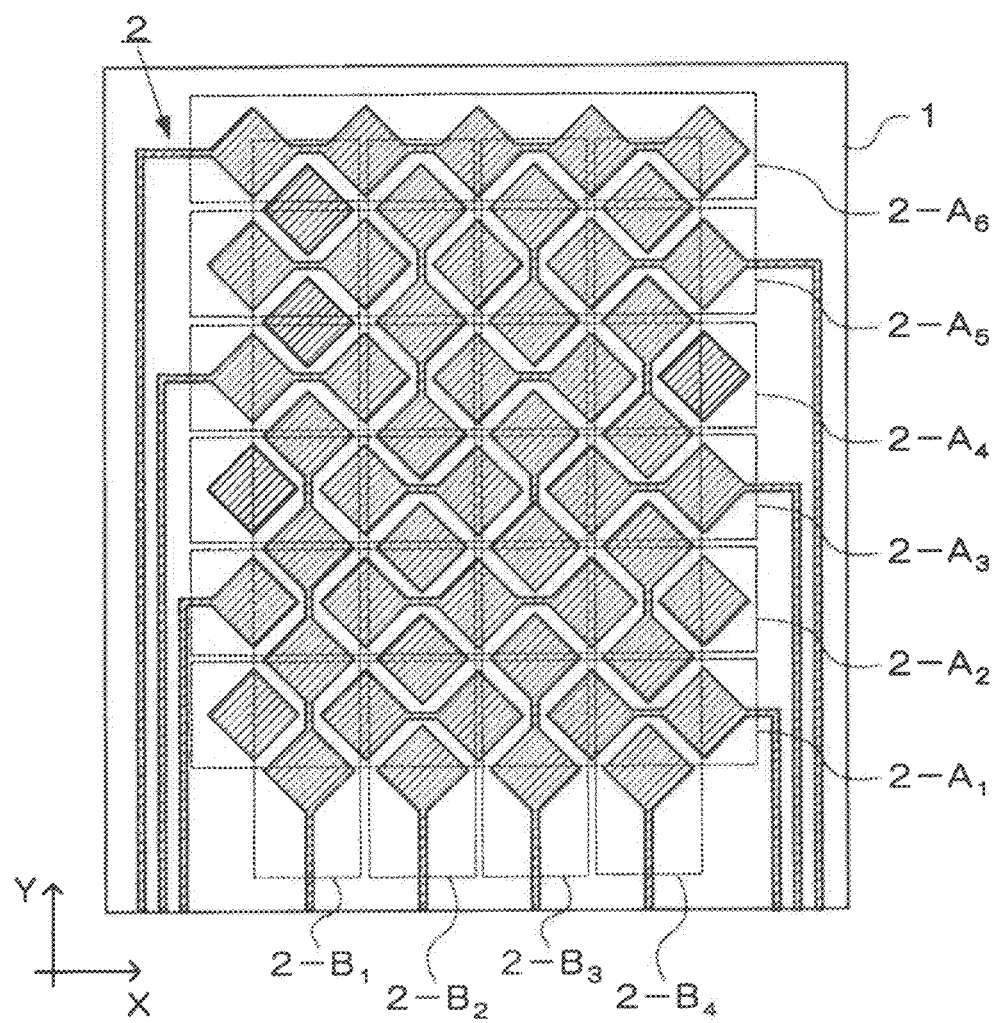
FIG. 12 is an explanation view showing another arrangement example of transparent electrode pattern.
Figure 13:
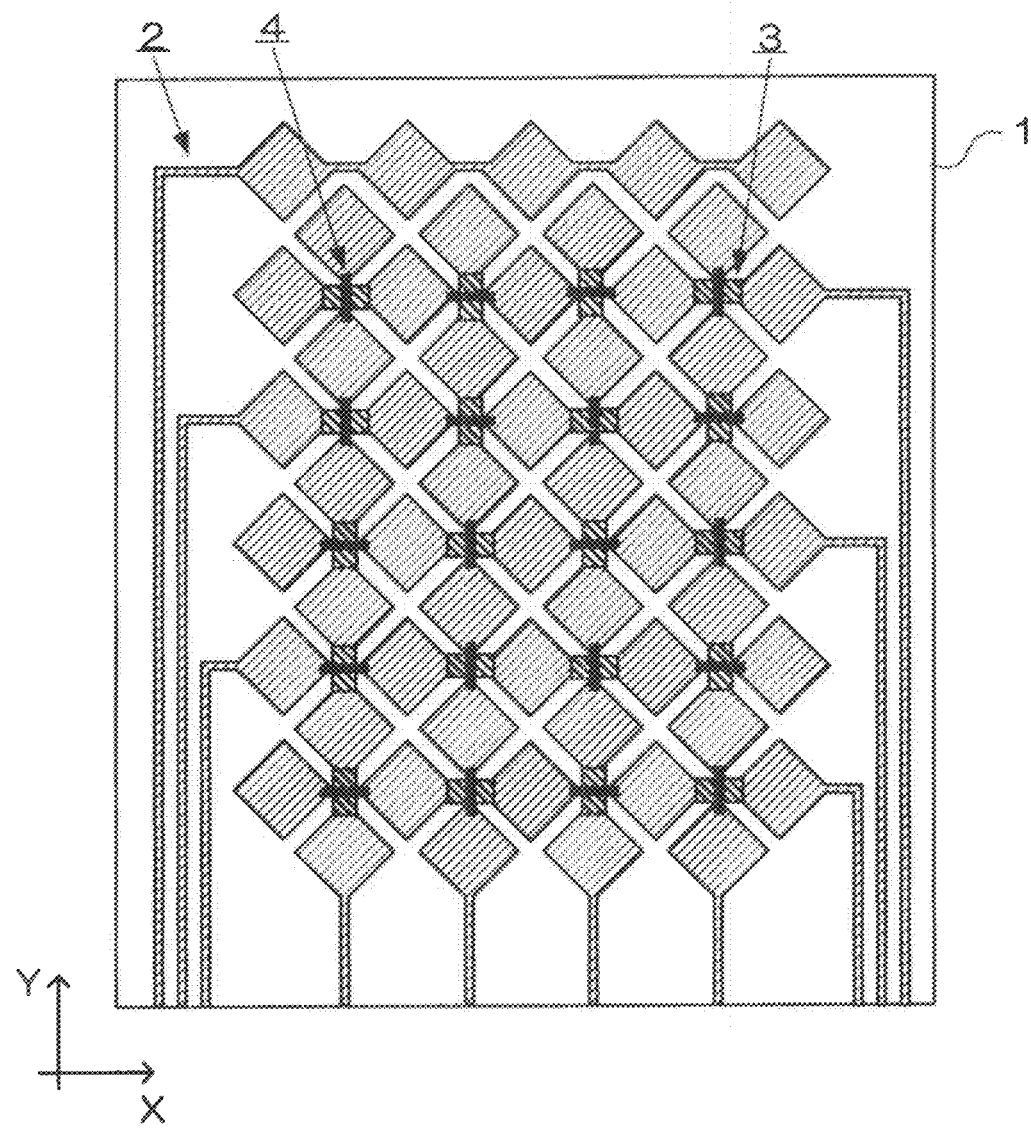
FIG. 13 is an explanation view showing a formation example of column electrode when the transparent electrode pattern shown in FIG. 12 is employed.

Further, as shown in FIG. 12, it is also possible to form intersecting column electrode patterns each containing a portion having a disconnected shape and a portion having a connected shape. Here, in the case of forming the transparent electrode pattern 2 of the arrangement example shown in FIG. 13, column electrodes shown in FIG. 13 are finally formed. With respect to connected form of column electrode patterns, it is sufficient that in an intersection region where a column electrode pattern including a plurality of electrode units arranged along a first axis direction intersects a column electrode pattern including a plurality of electrode units arranged along a second axis, a connecting wire connecting electrode units of either one of the column electrode patterns is present.

FIGS. 14(a) and 14(b) are explanation views showing another arrangement example of the transparent electrode pattern 2. Here, FIG. 14(a) shows a state that the transparent electrode pattern 2, an insulating layer 3 and a bridge wire ring pattern 4 are laminated. Further, FIG. 14(b) is an explanation view showing a state that the transparent electrode pattern 2, the insulating layer 3 and a bridge wiring pattern 4 are laminated in the vicinity of a region where the column electrode patterns 2-$A_1$ and 2-$B_1$ shown in FIG. 14(a) intersect each other. As shown in FIGS. 14(a) and 14(b), the construction may be such that in Y axis direction, two columns of rectangular electrode units 201 are arranged into a staggered form as one unit, and such arranged electrode units 201 are connected by connecting wires 202 to form staggered column electrode patterns 2-$B_1$ to 2-$B_3$. Meanwhile, in X axis direction, two columns of rectangular electrode units 201 are arranged into a staggered form as one unit, and the arranged electrode units 201 are connected by connecting wires 202 or bridge wires 401 to from staggered column electrode patterns 2-$A_1$ to 2-$A_4$. In the figure, the rectangular electrode units 201 constituting each column electrode pattern are arranged separately to each other with a slight gap into a staggered form. However, each column electrode pattern as a whole extends in X axis direction or Y axis direction so that the column electrode pattern extend in parallel along X axis direction or Y axis direction. Here, in FIG. 14(a), column electrode patterns of X axis direction and column electrode patterns of Y axis direction have different hatchings so that their axis directions are easily distinguishable.

Here, although omitted in the figures showing construction examples, the touch panel is provided with a circuit portion for detecting electrostatic capacity via column electrode patterns of the transparent electrode pattern 2. It is sufficient that the circuit portion is connected with a terminal portion of a lead wire 203 of each electrode pattern via e.g. a flexible film. Here, the circuit portion may be constituted by directly mounting an IC chip on a flexible film to be connected with the terminal portion of the lead wire 203 of each column electrode pattern.

Figure 15:
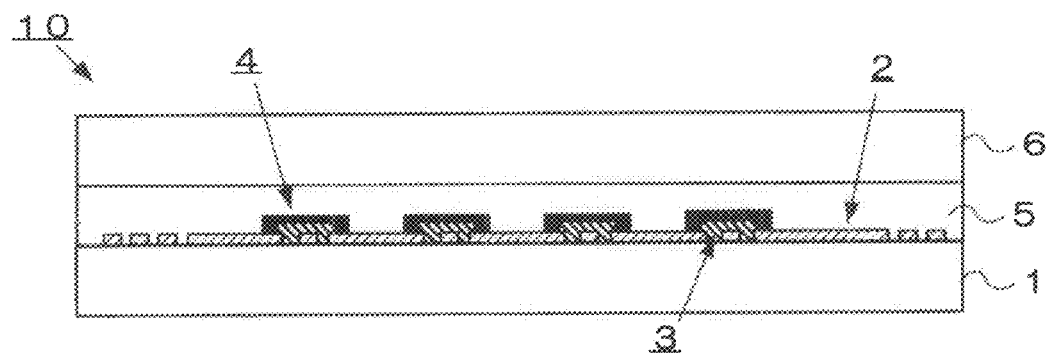
FIG. 15 is a schematic cross-sectional view showing another construction example of touch panel.

Further, for example, as shown in FIG. 15, in the touch panel 10, a protection glass 6 may be laminated via an adhesive layer 5 made of e.g. a UV-curable resin on the column electrode (more specifically, column electrodes of X axis direction and Y axis direction constituted by a transparent electrode pattern 2 and a bridge wiring pattern 4 sandwiching an insulating layer 3 therebetween) formed on a transparent substrate 1. FIG. 15 is a schematic cross-sectional view showing another construction example of the touch panel 10. Here, in such a construction, it is also possible to detect a touch position from the protection glass 6 side.

Figure 16:
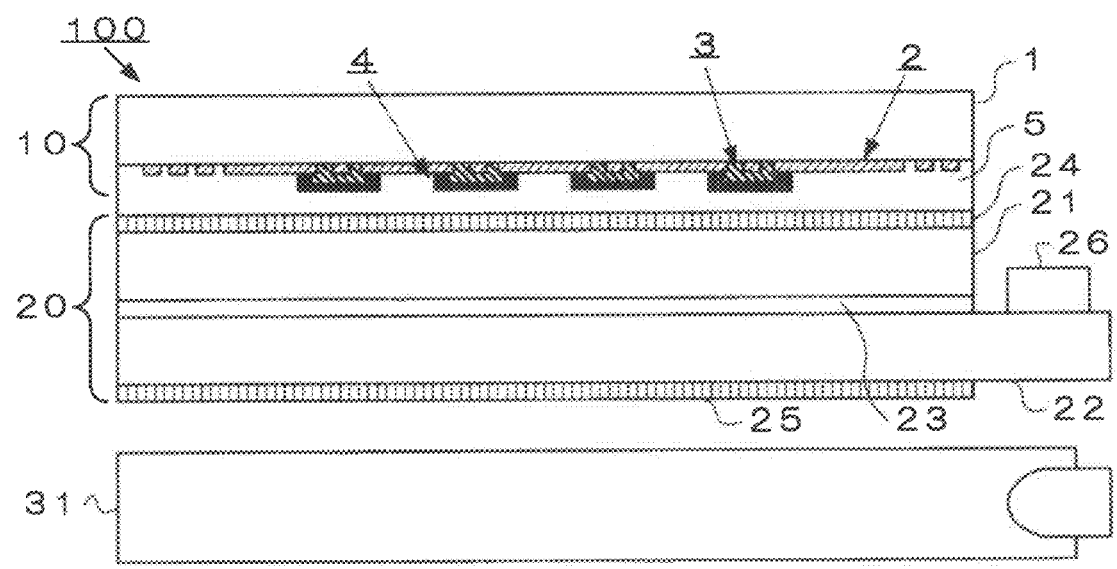
FIG. 16 is a schematic cross-sectional view showing another construction example of display device with an electrostatic capacity type touch panel.
Figure 17:
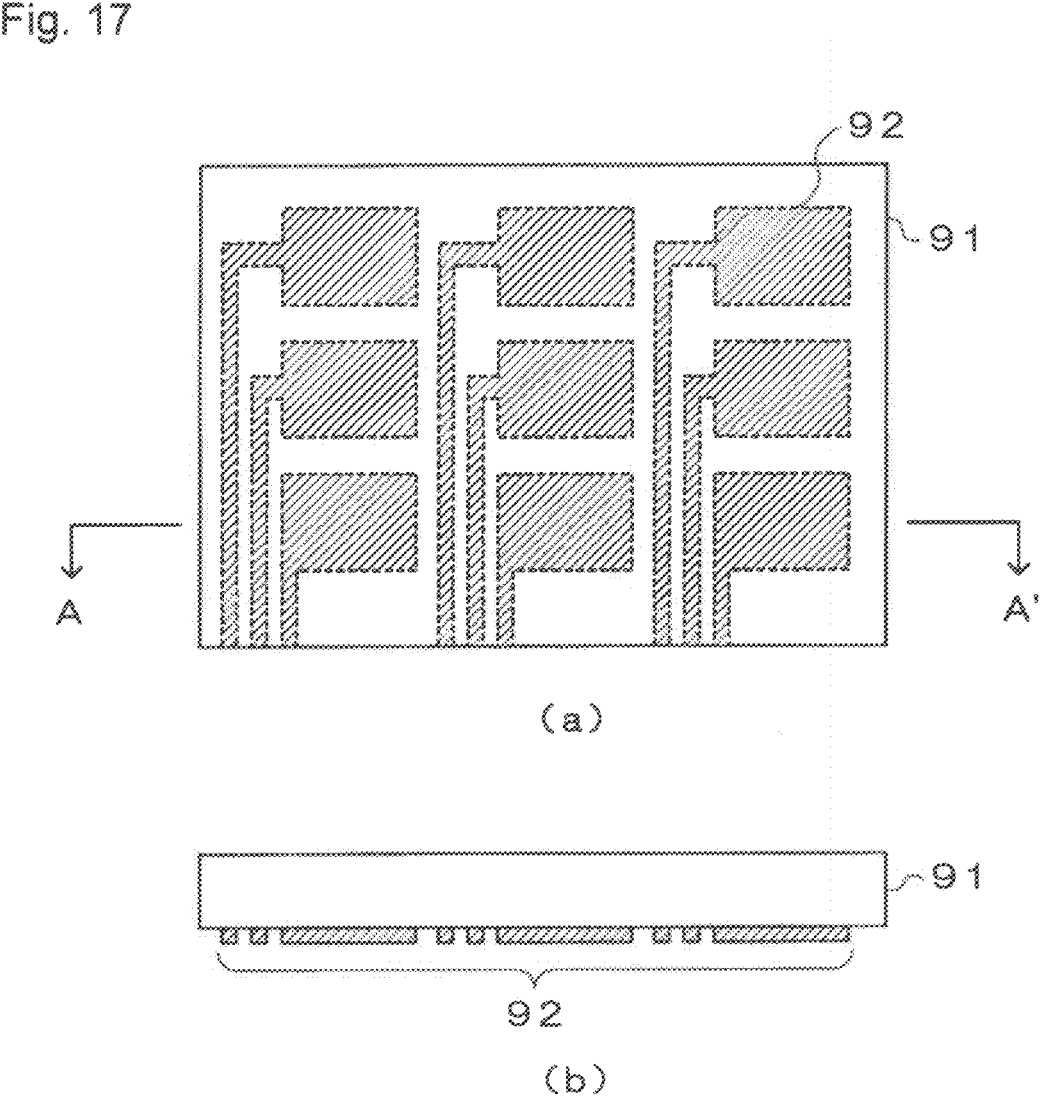
FIG. 17(a) is a plan view showing an arrangement example of transparent electrode pattern in an electrostatic capacity type touch panel.
FIG. 17(b) is a cross-sectional view along the line A-A' in FIG. 17(a).
Figure 18:
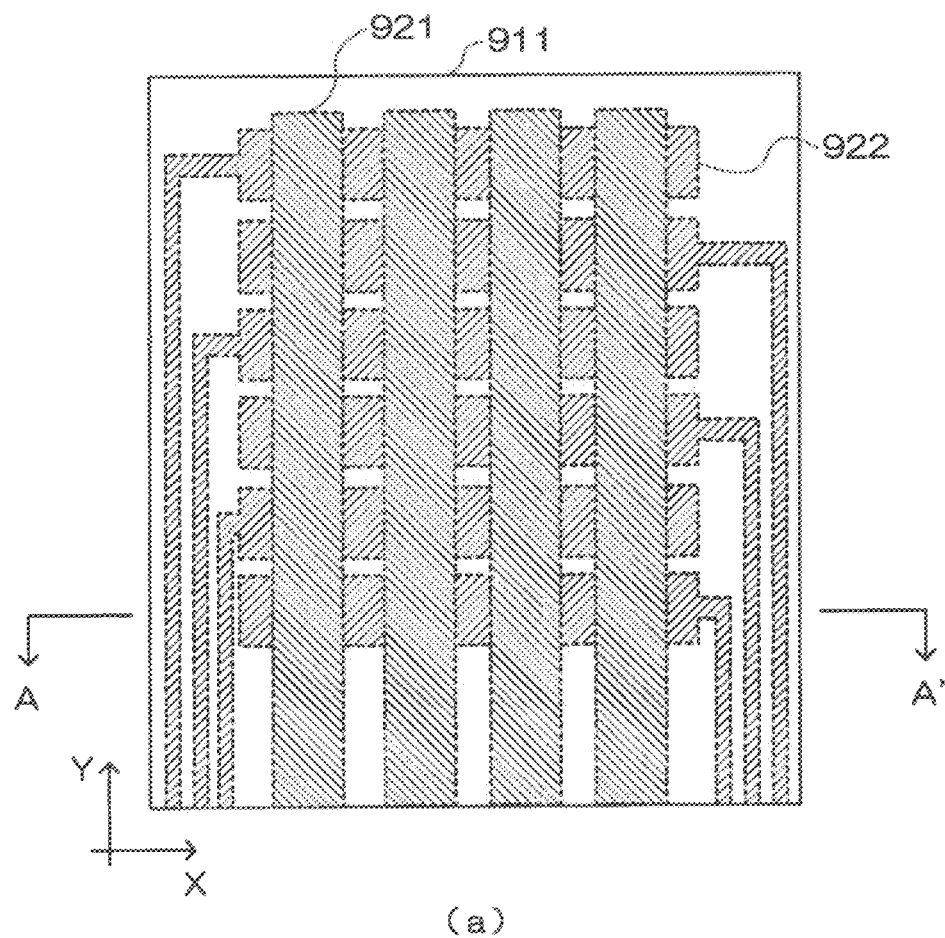
FIG. 18(a) is a plan view showing an arrangement example wherein the transparent electrode pattern is arranged in a matrix form by using the first method.
FIG. 18(b) is a cross-sectional view along the line A-A' in FIG. 18(a).
Figure 18:
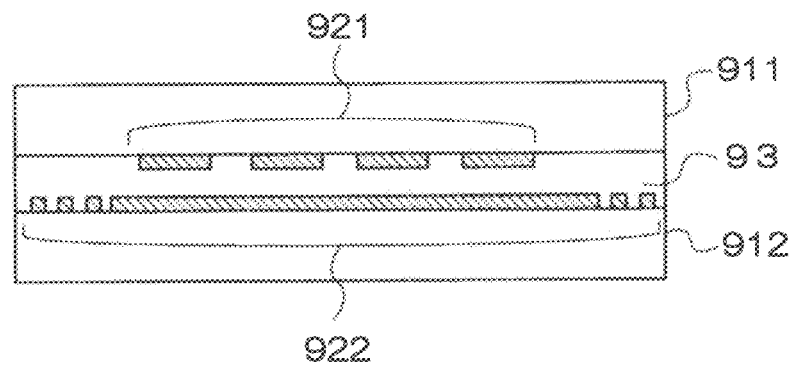
Figure 19:
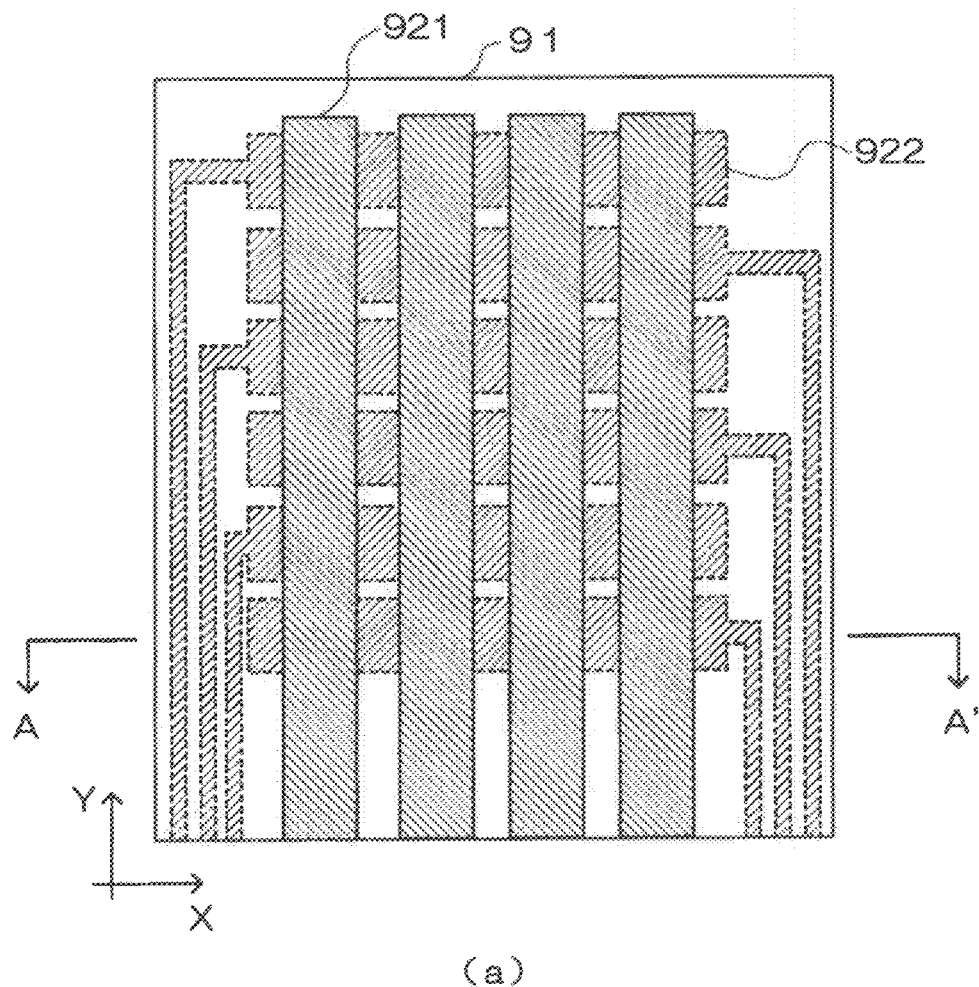
FIG. 19(a) is a plan view showing an arrangement example wherein the transparent electrode pattern is arranged in a matrix form by using the second method.
FIG. 19(b) is a cross-sectional view along the line A-A' in FIG. 19(a).
Figure 19:
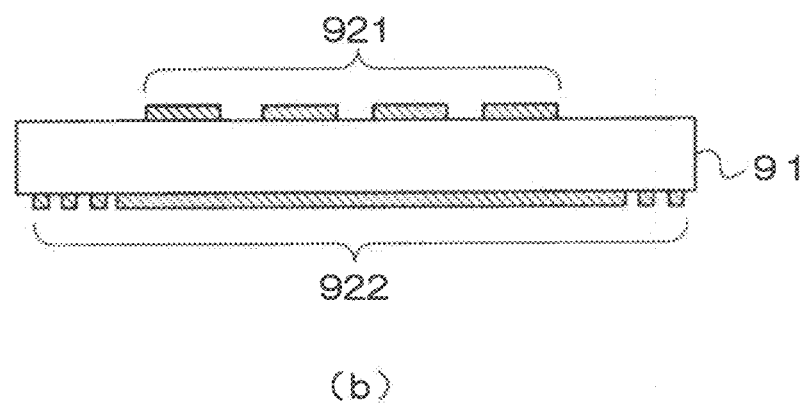

Further, for example, as shown in FIG. 16, it is also possible to integrate the touch panel 10 into a display device such as a liquid crystal display device, to constitute a display device with electrostatic capacity type touch panel function whereby detection of touch position is possible. FIG. 16 is a schematic cross-sectional view showing a construction example of a display device with electrostatic capacity type touch panel function. A display device 100 with electrostatic capacity type touch panel function shown in FIG. 16 has a touch panel-constituting portion 10, a display panel-constituting portion 20 and a backlight 31.

The touch panel-constituting portion 10 may have the same construction as that of the touch panel 10 shown in FIGS. 1(a) and 1(b). Namely, it is sufficient that on one surface of the transparent substrate 1, column electrodes functioning as a transparent electrode pattern arranged in a matrix form (more specifically, column electrodes of X axis direction and Y axis direction constituted by a transparent electrode pattern 2 and a bridge wiring pattern 4 and an insulating layer 3 sandwiched therebetween that are laminated) are formed.

Further, the display panel-constituting portion 20 may be the same as a common display device. For example, when the display panel-constituting portion 20 is a liquid crystal display device, it may have a construction wherein a first transparent substrate 21 and a second transparent substrate 22 sandwich a liquid crystal 23. Here, reference numerals 24 and 25 show polarizer plates. Further, reference numeral 26 shows a driver IC.

Here, on each of transparent substrates 21 and 22, e.g. segment electrodes and a common electrode for controlling the state of liquid crystal are formed, but these electrode are omitted in the drawings. Further, the liquid crystal 23 is sealed by the transparent substrates 21 and 22 and a sealing agent, but the sealing agent is omitted in the drawings.

For example, by laminating column electrodes formed on a transparent substrate 1 of the touch panel-constituting portion 10 with the uppermost layer (polarizer plate 24 in this example) on the viewer side of the display panel-constituting portion 20 via an adhesive layer 5 made of e.g. a UV-curable resin, it is possible to constitute a single liquid crystal display device. In the example shown in FIG. 16, lamination is made in a state that a surface of the transparent substrate 1 constituting the touch panel on which column electrodes are formed, faces to a liquid crystal display device. Thus, since the column electrodes for detecting a touch position is formed only on one surface of the transparent substrate, it is easily possible to integrate the touch panel into a display device without increasing the number of parts such as a protection glass. Further, it is also possible to make a portion of the touch panel to be touched to be easily understandable by combining the touch panel with the display device and changing the display state in accordance with touching state.

Here, in a case where a noise is generated in a change of electrostatic capacity detected by a column electrode pattern formed on the transparent substrate 1 of the touch panel-constituting portion 10 due to the combination with the liquid crystal display device, a transparent electrode functioning as grounding may be provided between the touch pane-constituting portion 10 and the display panel-constituting portion 20. It is sufficient that the transparent electrode to be provided between the touch panel-constituting portion 10 and the display panel-constituting portion 20 is formed so as to cover the entire surface of the panel region without being patterned.

Here, it is sufficient that the transparent electrode functioning as grounding is formed to be present on the other side of the column electrodes formed on the transparent substrate 1 of the touch panel-constituting portion 10, from a surface to be touched. For example, the construction may be such that the touch panel-constituting portion 10 is formed by laminating a protection glass 6 on column electrodes formed on a transparent substrate 1 via an adhesive layer 5, a transparent electrode made of e.g. ITO is formed on the entire surface of the substrate to be laminated with the uppermost layer of a liquid crystal display panel-constituting portion 20, and lamination is made via an adhesive layer 5 made of e.g. UV-curable resin. In such a construction, it is possible to stably detect a touch position without having an influence of noise from the display device.

Here, as a method of laminating a display device or a protection glass (protection cover) on the transparent substrate 1 on which column electrodes to detect a touch position are formed, a method of employing e.g. an UV-curable resin has been shown, but there is a method of employing a double-sided adhesive film (PSA) besides the above method. In the case of employing a PSA, for example, it is sufficient that the PSA is pasted on the column electrodes and lamination with a liquid crystal display device or a protection cover is carried out in a vacuum environment. Here, it is preferred to carry out pressurizing while reducing bubbles by employing e.g. an autoclave apparatus (pressurizing degassing apparatus). Further, in a case of employing a resin, the process may be such that a liquid resin is applied on column electrodes of the transparent substrate, the liquid crystal display device or the protection cover is slowly laminated, and finally UV exposure is carried out to cure the resin.

Here, in FIGS. 1(a) to 14, column electrodes extending in both directions are explained with a definition that X axis direction is a first direction and Y direction is a second direction, but it is a matter of course that X axis direction may be defined as the second direction and Y axis direction may be defined as the first direction.

Now, example of the present invention will be described.

Example 1

Example 1 is an example of touch panel wherein 4 columns×6 columns of column electrode patterns are arranged in a matrix form to obtain a touch region of 4 cm wide×6 cm high. In this Example, on one surface of a glass substrate of 0.55 mm, an ITO film of 20 nm thick was formed by a sputtering method, and it was patterned into a pattern shape shown in FIG. 3 by using a photolithography technique, to form a transparent electrode pattern 2. Namely, a transparent electrode pattern 2 was formed, wherein the shape of each electrode unit 201 constituting each column electrode pattern was made to be a rhombic shape, and the transparent electrode pattern 2 included 6 columns of column electrode patterns $2\text{-}A_1$ to $2\text{-}A_6$ each constituted by a group of electrode units arranged in X axis direction being the lateral direction, 4 columns of column electrode patterns $2\text{-}B_1$ to $2\text{-}B_4$ each constituted by a group of electrode units arranged in Y axis direction being the vertical direction, and lead wires to these electrode patterns. Here, in this Example, among column electrode patterns, column electrode patterns $2\text{-}B_1$ to $2\text{-}B_4$ constituted by a group of electrodes arranged in Y axis direction was formed into a connected shape wherein connecting wires 202 were provided to connect the electrodes, and each of other column electrode patterns $2\text{-}A_1$ to $2\text{-}A_6$ was formed into a disconnected shape wherein electrodes were disconnected without being connected by the connecting wires 202. Further, in this Example, the length of each side of the rhombic-shaped electrode unit 201 is 5 mm, the width of the connecting wire 202 is 0.5 mm, and the length of the connecting wire 202 is 1.5 mm.

Figure 4:
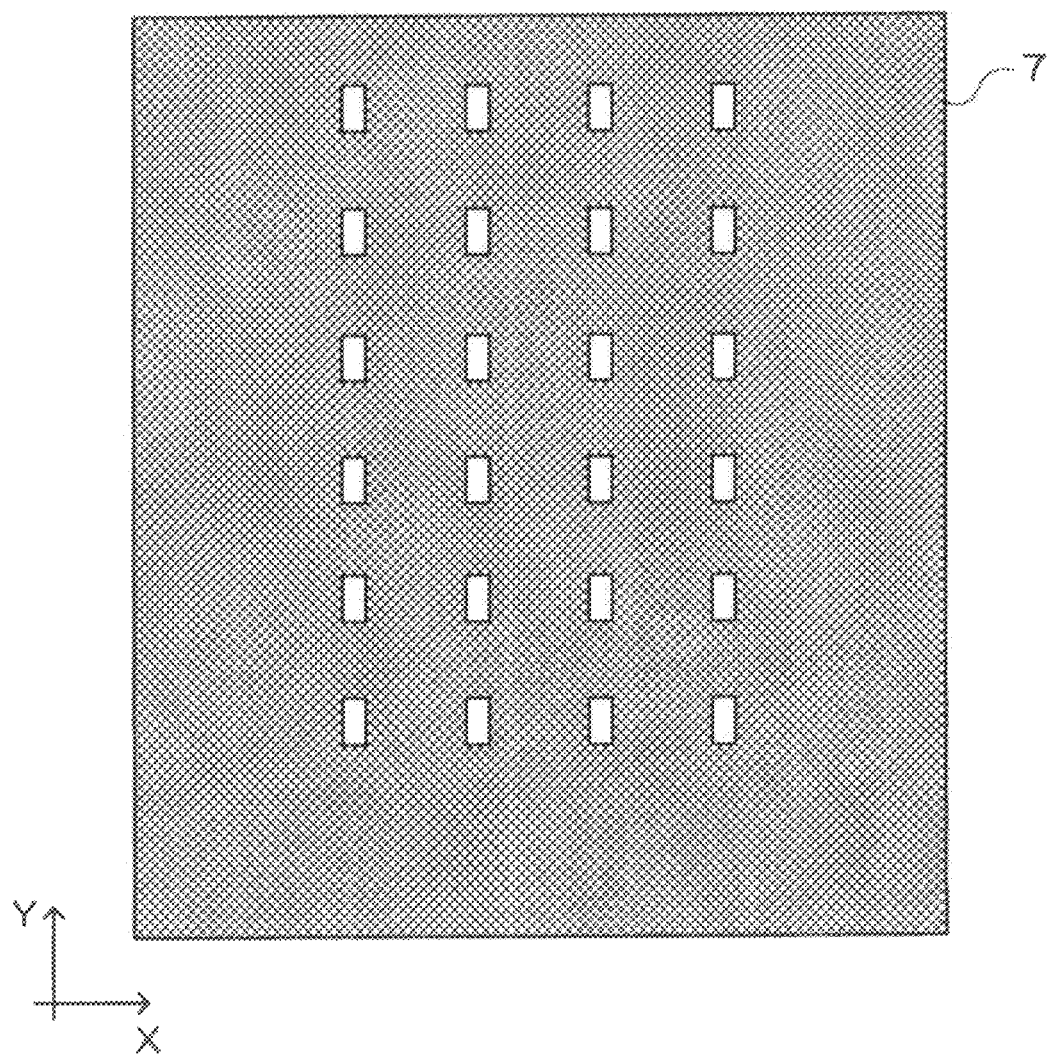
FIG. 4 is an explanation view showing an example of mask pattern for forming an insulating layer.
Figure 5:
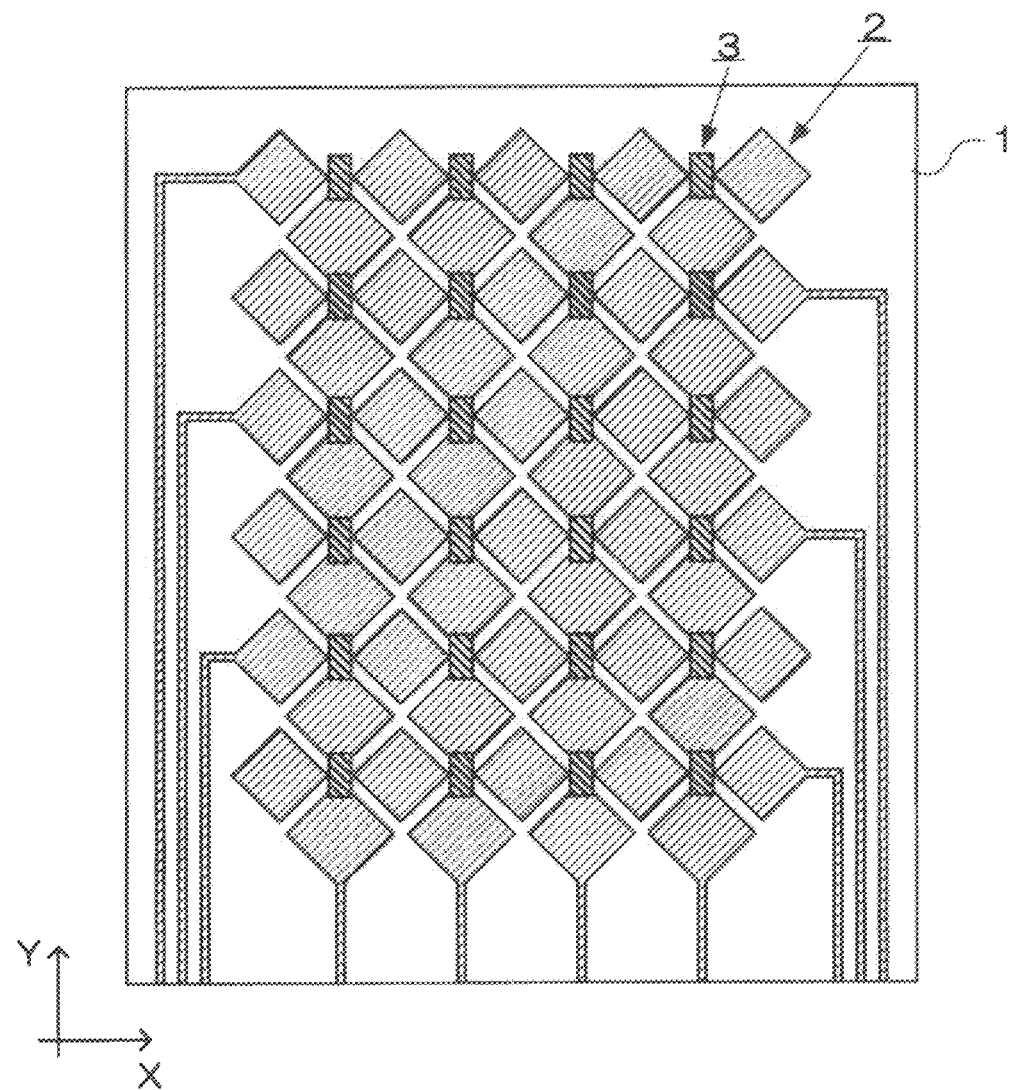
FIG. 5 is an explanation view showing an example of touch panel in a state that the insulating layer is formed.

Next, by using the mask pattern 7 shown in FIG. 4, a film of $SiO_2$ having a thickness of 100 nm was formed, to form an insulating layer 3. As a mask pattern 7, a plate made of a metal provided with holes having an arrangement and a shape corresponding to those of the insulating layer 3, was employed. In this Example, as shown in FIG. 4, a mask pattern 7 is employed, which can form an insulating layer 3 covering regions where the column electrode patterns $2\text{-}B_1$ to $2\text{-}B_4$ each formed into a connected shape overlap with a bridge wiring pattern 4 to be formed in a subsequent step. Here, in this Example, each piece of insulating layer 3 has a length of 1.5 mm in X axis direction and a length of 3 mm in Y axis direction.

Next, using the mask pattern 8 shown in FIG. 6, an ITO film having a thickness of 20 nm is formed to form a bridge-wiring pattern 4. As a mask pattern 8, a plate made of a metal provided with holes having an arrangement and a shape corresponding to those of the bridge-wiring pattern 4, was employed. In this Example, as shown in FIG. 6, a mask pattern 8 is employed, which can form a bridge-wiring pattern 4 having bridge wires 401 for providing electric conduction between electrode units included in each of the column electrode patterns $2\text{-}A_1$ to $2\text{-}A_6$ each formed into a disconnected shape, over the insulating layer 3. Here, in this Example, each connecting wire has a width of 0.5 mm and a length of 3 mm.

Then, to a terminal portion of a lead wire 203 of each column electrode pattern formed on the transparent substrate 1, a circuit board is connected via a flexible film. With a touch panel 10 thus completed, it was confirmed that a portion in contact with a finger can be detected.

Further, to the touch panel thus completed, a protection glass 6 was further laminated via an adhesive layer 5 made of a resin, and it was confirmed that detection of a portion in contact with a finger was still possible.

Example 2

Example 2 is an Example wherein the order of formation of films is different from that of Example 1. In this Example, on one surface of a glass substrate of 0.55 mm, an ITO film having a thickness of 20 nm was formed by using a mask pattern 8 shown in FIG. 6, to form a bridge-wiring pattern 4. Next, by using the mask pattern 7 shown in FIG. 4, a $SiO_2$ film having a thickness of 100 nm was formed, to form an insulating layer 3. On the insulating layer 3, an ITO film having a thickness of 20 nm was formed by a sputtering method, it was patterned into the pattern shape shown in FIG. 3 by using a photolithography technique, to form a transparent electrode pattern 2.

Then, to a terminal portion of a lead wire 203 of each column electrode pattern formed on the transparent electrode 1, a circuit board was connected via a flexible film. With a touch panel 10 thus completed, it was confirmed that a portion in contact with a finger can be detected.

Example 3

Example 3 is an Example wherein the bridge-wiring pattern 4 was formed by employing a metal material. In this Example, the production process is the same as that of Example 1 except that Mo containing Nb was employed as an electrically conductive material at the time of forming the bridge-wiring pattern 4. In this Example, a Mo (containing Nb) film having a film thickness of 100 nm was formed by a sputtering method, and it was patterned into the bridge-wiring pattern 4 by using a photolithography technique. In this Example, the width of each connecting wire 202 was 20 μm.

Then, to a terminal portion of a lead wire 203 of each column electrode pattern formed on the transparent substrate 1, a circuit board was connected via a flexible film. With a touch panel 10 thus completed, it was confirmed that a portion in contact with a finger can be detected.

Although a metal material was employed as an electrically conductive material, since the wiring width was made to be thin, it was confirmed that the visibility of the bridge-wiring pattern was in the level of causing no problem.

Further, even with the order of formation of films shown in Example 2, in the same manner, it was confirmed that a portion in contact with a finger can be detected and that the visibility of the bridge-wiring pattern 4 was in the level of causing no problem.

Example 4

Figure 14:
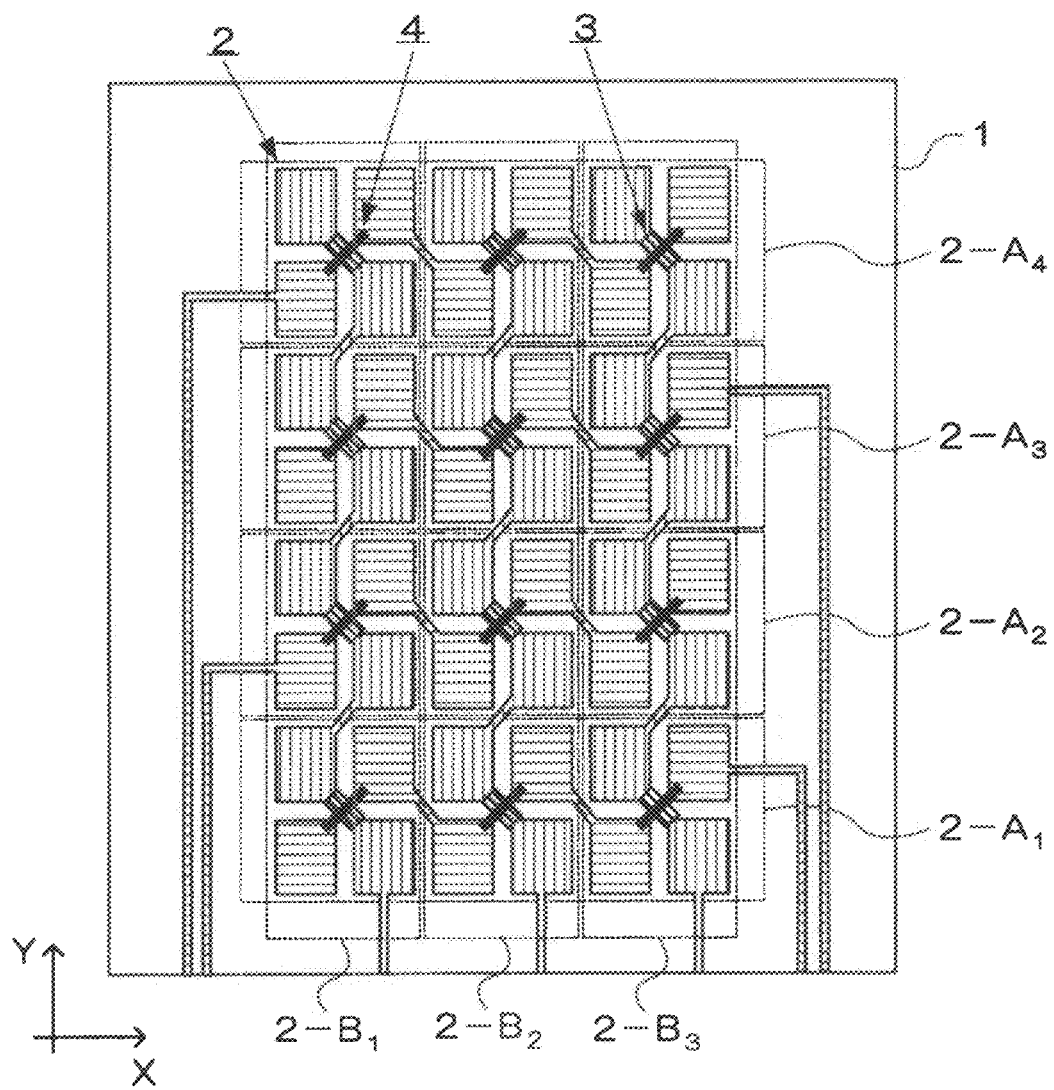
FIGS. 14(a) and 14(b) are explanation views showing another arrangement example of transparent electrode pattern.
Figure 14:
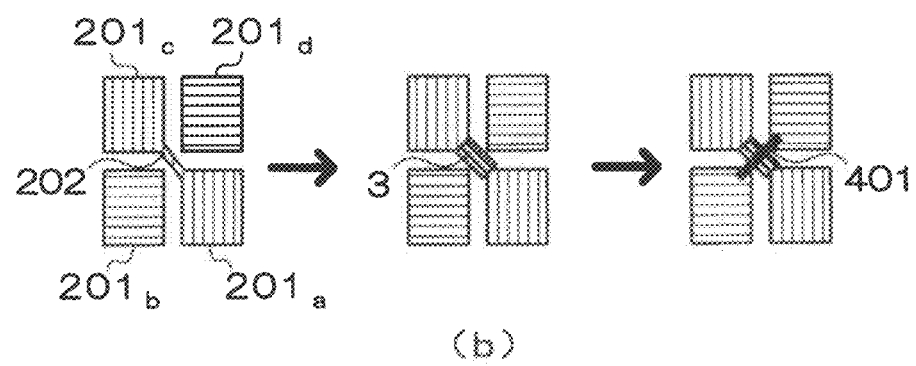

In this Example, by using a mask which can form a bridge-wiring pattern 4 including bridge wires 401 corresponding to patterns of the transparent electrode pattern 2 shown in FIGS. 14(*a*) and 14(*b*) on one surface of the glass substrate, a bride-wiring pattern 4 made of a Nb-containing Mo layer having a thickness of 100 nm was formed by using a sputtering method. Subsequently, by using a photosensitive photolithography resin, an insulating layer 3 was partially formed by a photolithography process so that both ends of each bridge wire 401 was exposed. Subsequently, on the insulating layer 3, an ITO transparent electrically conductive film having a thickness of 20 nm was formed by a sputtering method, and the ITO film was patterned by a photolithography process to form a transparent electrode pattern 2 including a plurality of columns of column electrode patterns extending along X axis direction and Y axis direction as shown in FIGS. 14(*a*) and 14(*b*).

Then, to a terminal portion of a lead wire 203 of each column electrode pattern formed on the transparent substrate 1, a circuit board was connected via a flexible film. With a touch panel 10 thus completed, it was confirmed that a portion in contact with a finger can be detected.

INDUSTRIAL APPLICABILITY

The present invention is suitably applicable to a touch panel for detecting a touch position by using a matrix method, and a display device provided with such a touch panel function.

The entire disclosure of Japanese Patent Application No. 2008-234934 filed on Sep. 12, 2008 including specification, claims, drawings and summary is incorporated herein by reference in its entirety.

What is claimed is:

1. An electrostatic capacity type touch panel comprising: a transparent substrate, a plurality of columns of electrodes present on one surface of the transparent substrate and extending in a first direction and a plurality of rows of electrodes present on said one surface of the transparent substrate and extending in a second direction intersecting the first direction, at least two adjacent electrode units in at least one column and in at least one row being connected by a connecting wire in contact with the one surface of the transparent substrate and at least two adjacent electrode units in at least one column and in at least one row being connected by a bridge wire free of contact with the one surface of the transparent substrate;
   the columns of electrodes extending in the first direction being electrically disconnected from the rows of electrodes extending in the second direction by an electrically insulating layer provided at least in a part of intersection regions of the columns and rows of electrodes.

2. The electrostatic capacity type touch panel according to claim 1, wherein the columns of electrodes extending in the first direction and the rows of electrodes extending in the second direction are arranged on the same surface of the transparent substrate so as not to overlap with one another except for intersecting connecting wires and bridge wires at each intersection region.

3. The electrostatic capacity type touch panel according to claim 1, wherein the columns of electrodes and the rows of electrodes are constituted by an electrode pattern including a plurality of electrode units and connecting wires connecting some of the electrode units.

4. The electrostatic capacity type touch panel according to claim 1, wherein columns of electrodes and the rows of electrodes are constituted by an electrode pattern including a plurality of electrode units, some of which are connected by bridge wires each connecting adjacent electrode units included in the electrode pattern so as to sandwich an electrically insulating layer between each bridge wire and a connecting wire present between other electrode units.

5. An electrostatic capacity type touch panel comprising a transparent substrate, a plurality of columns of electrode patterns arranged on one surface of the transparent substrate along a first direction, and a plurality of rows of electrode patterns arranged on said one surface of the substrate along a second direction intersecting the first direction, at least two adjacent electrode units in at least one column and in at least one row being connected by a connecting wire in contact with the one surface of the transparent substrate and at least two adjacent electrode units in at least one column and in at least one row being connected by a bridge wire free of contact with the one surface of the transparent substrate;
   each electrode pattern of the second direction including the connecting wires each connecting adjacent electrode units included in the electrode pattern;
   each connecting wire being provided at least in a region where the electrode pattern including the connecting wire intersects another electrode pattern so that the connecting wire is provided through a space between electrode units of said another electrode pattern so as to be isolated from the electrode units;
   the electrostatic capacity type touch panel further comprising an electrically insulating layer covering each region where a connecting wire intersects with a bridge wire such that the electrically insulating layer is sandwiched between the bridge wire and the connecting wire.

6. The electrostatic capacity type touch panel according to claim 5, wherein all adjacent electrode units included in at least one electrode pattern of the first direction have electric conduction with each other by a bridge wire, and some adjacent electrode units included in all electrode patterns of the second direction have electric conduction with each other by the connecting wire.

7. An electrostatic capacity type touch panel comprising a transparent substrate, a plurality of columns of electrode patterns arranged on one surface of the transparent substrate along a first direction, and a plurality of rows of electrode patterns arranged on said one surface of the transparent substrate along a second direction intersecting the first direction, at least two adjacent electrode units in at least one column and in at least one row being connected by a connecting wire in contact with the one surface of the transparent substrate and at least two adjacent electrode units in at least one column and in at least one row being connected by a bridge wire free of contact with the one surface of the transparent substrate;
   at least one electrode pattern of the first direction and an electrode pattern of the second direction, that intersect each other, further including at least one connecting wire for connecting at least one pair of adjacent electrode units included in the electrode pattern;
   each connecting wire being provided at least in a region where the electrode pattern including the connecting wire intersects another electrode pattern so that the connecting wire is provided through a space between electrode units of said another electrode pattern so as to be isolated from the electrode units;
   the electrostatic capacity type touch panel further comprising an electrically insulating layer covering a region where a connecting wire intersects with a bridge wire such that the electrically insulating layer is sandwiched between the bridge wire and the connecting wire.

8. The electrostatic capacity type touch panel according to claim 7, wherein adjacent electrode units included in the electrode pattern of the first direction have electric conduction by a bridge wire or a connecting wire to, and
adjacent electrode units included in the electrode pattern of the second direction have electric conduction by the bridge wire or the connecting wire.

9. The electrostatic capacity type touch panel according to claim 5, wherein the electrode patterns of the first direction and the electrode patterns in the second direction are arranged so as not to overlap on the same plane of the transparent substrate.

10. The electrostatic capacity type touch panel according to claim 7, wherein the electrode patterns of the first direction and the electrode patterns in the second direction are arranged so as not to overlap on the same plane of the transparent substrate.

11. The electrostatic capacity type touch panel according to claim 1, which further comprises a transparent electrode on the entire surface of a substrate present on the other side of the electrodes formed on the transparent substrate, from a surface to be touched.

12. The electrostatic capacity type touch panel according to claim 5, which further comprises a transparent electrode on the entire surface of a substrate present on the other side of the electrodes formed on the transparent substrate, from a surface to be touched.

13. The electrostatic capacity type touch panel according to claim 7, which further comprises a transparent electrode on the entire surface of a substrate present on the other side of the electrodes formed on the transparent substrate, from a surface to be touched.

14. The electrostatic capacity type touch panel according to claim 1, wherein a shape of each electrode unit is polygonal.

15. The electrostatic capacity type touch panel according to claim 5, wherein a shape of each electrode unit is polygonal.

16. The electrostatic capacity type touch panel according to claim 7, wherein a shape of each electrode unit is polygonal.

17. The electrostatic capacity type touch panel according to claim 1, wherein at least the electrode patterns are each made of a transparent electrically conductive film.

18. The electrostatic capacity type touch panel according to claim 5, wherein at least the electrode patterns are each made of a transparent electrically conductive film.

19. The electrostatic capacity type touch panel according to claim 7, wherein at least the electrode patterns are each made of a transparent electrically conductive film.

20. A display device with an electrostatic capacity type touch panel function comprising a display device and the electrostatic capacity type touch panel as defined in claim 1, that is laminated on a viewer side surface of the display device via a resin layer.

21. A display device with an electrostatic capacity type touch panel function comprising a display device and the electrostatic capacity type touch panel as defined in claim 5, that is laminated on a viewer side surface of the display device via a resin layer.

22. A display device with an electrostatic capacity type touch panel function comprising a display device and the electrostatic capacity type touch panel as defined in claim 7, that is laminated on a viewer side surface of the display device via a resin layer.

23. A process for producing an electrostatic capacity type touch panel, comprising a transparent electrode pattern-forming step of forming on the same surface of a transparent substrate a transparent electrode pattern including an electrode pattern extending in a first direction, and an electrode pattern extending in a second direction, and a connecting wire connecting electrode units constituting at least one of the electrode patterns and provided at least in an intersection region where the electrode pattern extending in the first direction intersects the electrode pattern extending in the second direction, at least two adjacent electrode units in at least one electrode pattern extending in the first direction and in at least one electrode pattern extending in the second direction being connected by a connecting wire in contact with the surface of the transparent substrate and at least two adjacent electrode units in at least one electrode pattern extending in the first direction and in at least one electrode pattern extending in the second direction being connected by a bridge wire free of contact with the surface of the transparent substrate;
a bridge-wiring pattern-forming step of forming a bridge-wiring pattern including the bridge wire connecting electrode units not being connected by the connecting wire, the electrode units being disposed in the intersection region so as to be isolated from the connecting wire of another pattern to prevent electric conduction with the connecting wire; and
an electrically insulating layer-forming step between the transparent electrode pattern forming step and the bridge-wiring pattern forming step, the electrically insulating layer-forming step being a step of forming an electrically insulating layer covering at least a region where the connecting wire included in the transparent electrode pattern overlaps with the bridge wire included in the bridge-wiring pattern.

24. The process for producing an electrostatic capacity type touch panel according to claim 23, comprising, in the following order, a transparent electrode pattern-forming step of forming on the same surface of a transparent substrate a transparent electrode pattern including an electrode pattern extending in a first direction, an electrode pattern extending in a second direction, and a connecting wire connecting electrode units constituting at least one of the electrode patterns and provided at least in an intersection region where the electrode pattern extending in the first direction intersects the electrode pattern extending in the second direction;
an electrically insulating layer-forming step of forming an electrically insulating layer covering a region where a wiring region necessary to connect electrode units not connected by a connecting wire, the electrode units being disposed so as to be isolated from the connecting wire in the intersection region so as to avoid electrical conduction with the connecting wire, overlaps with the connecting wire provided through a space between the electrode units, to form an electrically insulating layer; and
a bridge-wiring pattern-forming step of forming a bridge-wiring pattern including a bridge wire connecting electrode units disposed so as to be isolated from the connecting wire in the intersection region so as not to have electric conduction with the connecting wire, and so as to sandwich the electrically insulating layer between the bridge wire and the connecting wire present through a space between the electrode units.

25. The process for producing an electrostatic capacity type touch panel according to claim 23, comprising, in the following order, a bridge-wiring pattern forming step of forming on the same surface of one side of the transparent substrate a bridge-wiring pattern including a bridge wire to be disposed at a predetermined portion of the surface of the transparent substrate for connecting electrode units constituting an electrode pattern, the electrode units being disposed so as to be isolated from a connecting wire so as to avoid electric conduction with the connecting wire in the intersection region included in the transparent electrode pattern, the transparent electrode pattern including an electrode pattern extending in a first direction, an electrode pattern extending in a second direction, and a connecting wire provided at least in an intersection region where the electrode pattern extending in the first direction intersects the electrode pattern extending in the second direction, so that the connecting wire connects electrode units constituting one of the electrode patterns;

an electrically insulating layer-forming step of forming an electrically insulating layer covering an intermediate portion of the bridge wire included in the bridge-wiring pattern so that both ends of the bridge wire are exposed; and a transparent electrode pattern-forming step of forming the transparent electrode pattern at a position whereby the electrode units not connected by the connecting wire in the transparent electrode pattern, are connected by the bridge wire for connecting the electrode units, so that the electrode units have electrical conduction from each other.

\* \* \* \* \*